(12) United States Patent
Nagy et al.

(10) Patent No.: US 8,490,363 B2
(45) Date of Patent: *Jul. 23, 2013

(54) MODULAR CONCRETE BUILDING

(75) Inventors: John R. Nagy, Hartland, WI (US); Clinton C. Krell, Waukesha, WI (US)

(73) Assignee: The Spancrete Group, Inc., Waukesha, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/419,117

(22) Filed: Mar. 13, 2012

(65) Prior Publication Data

US 2013/0061553 A1    Mar. 14, 2013

Related U.S. Application Data

(63) Continuation-in-part of application No. 12/317,983, filed on Dec. 31, 2008, now Pat. No. 8,132,388.

(51) Int. Cl.
*E04B 1/00* (2006.01)
*E02D 27/32* (2006.01)

(52) U.S. Cl.
USPC .............. 52/745.05; 52/250; 52/261; 52/294

(58) Field of Classification Search
USPC ................ 52/745.05, 234, 236.5, 236.3, 250, 52/251, 252, 261, 262, 264, 292, 293.1, 293.3, 52/294, 263
See application file for complete search history.

(56) References Cited

U.S. PATENT DOCUMENTS

| 814,134 | A | 3/1906 | Hood |
|---|---|---|---|
| 1,205,465 | A | 11/1916 | Maguire et al. |
| 2,053,873 | A | 9/1936 | Niederhofer |
| 2,139,623 | A | 12/1938 | Marston |
| 2,337,743 | A | 12/1943 | Deuel |
| 2,592,634 | A | 4/1952 | Wilson |
| 2,691,291 | A | 10/1954 | Henderson |
| 3,319,387 | A | 5/1967 | Stewing et al. |
| 3,495,371 | A | 2/1970 | Mitchell, Jr. |
| 3,510,997 | A | 5/1970 | Ratych |
| 3,621,624 | A | 11/1971 | Gustafson |
| 3,693,308 | A | 9/1972 | Trezzini et al. |
| 3,724,141 | A | 4/1973 | Kelleher |
| 3,772,835 | A | 11/1973 | Cox et al. |
| 3,898,776 | A | 8/1975 | Cox et al. |

(Continued)

FOREIGN PATENT DOCUMENTS

WO    WO91/02885    3/1991

OTHER PUBLICATIONS

Office Action dated Feb. 25, 2011; In related case U.S. Appl. No. 12/319,027, filed Dec. 31, 2008.

(Continued)

*Primary Examiner* — Mark Wendell
(74) *Attorney, Agent, or Firm* — Ryan Kromholz & Manion, S.C.

(57) ABSTRACT

A modular concrete building is made of a plurality of precast concrete panels which may be assembled to provide a building. The panel sections include lower frame panels or support members, wall panels, floor panels, and flat roof panels. The building may be assembled by securing the floor panels to the support members, securing the wall panels to the floor panels, and securing the roof panels to the wall panels and to adjacent roof panels. The roof panels may have rigid insulation. The roof panels may have tapered rigid insulation or the modular building may be constructed with the roof panels in a tilted position.

13 Claims, 31 Drawing Sheets

U.S. PATENT DOCUMENTS

| | | | |
|---|---|---|---|
| 3,918,222 A | 11/1975 | Bahramian | |
| 3,952,471 A | 4/1976 | Mooney | |
| 4,001,990 A | 1/1977 | Chase et al. | |
| 4,100,705 A | 7/1978 | Diana | |
| 4,231,199 A | 11/1980 | Gomez et al. | |
| 4,240,233 A | 12/1980 | Vercelletto | |
| 4,398,378 A | 8/1983 | Heitzman | |
| 4,513,545 A | 4/1985 | Hopkins, Jr. | |
| 4,545,159 A | 10/1985 | Rizk | |
| 4,569,167 A | 2/1986 | Staples | |
| 4,598,515 A | 7/1986 | Diana | |
| 4,627,205 A | 12/1986 | Hitchins | |
| 4,655,016 A | 4/1987 | Jacob | |
| 4,759,160 A | 7/1988 | Fischer | |
| 4,768,938 A | 9/1988 | Greeson | |
| 4,909,001 A | 3/1990 | Gonzalez Espinosa de Los Monteros | |
| 5,081,805 A | 1/1992 | Jazzar | |
| 5,313,753 A | 5/1994 | Sanger | |
| 5,381,635 A | 1/1995 | Sanger | |
| 5,487,241 A | 1/1996 | Gorrell et al. | |
| 5,671,582 A | 9/1997 | Reay | |
| 5,678,372 A | 10/1997 | Thomson et al. | |
| 5,761,862 A | 6/1998 | Hendershot et al. | |
| 5,794,386 A | 8/1998 | Klein | |
| 5,845,441 A | 12/1998 | Swartz | |
| 5,865,001 A | 2/1999 | Martin et al. | |
| 5,987,827 A | 11/1999 | Lord | |
| 6,058,672 A | 5/2000 | McClellan | |
| 6,073,401 A | 6/2000 | Iri et al. | |
| 6,119,417 A | 9/2000 | Valverde et al. | |
| 6,260,320 B1 | 7/2001 | DiLorenzo | |
| 6,643,981 B2 | 11/2003 | Pina et al. | |
| 6,668,507 B2 | 12/2003 | Blanchet | |
| 6,698,150 B1 | 3/2004 | DiLorenzo | |
| 6,955,016 B1 | 10/2005 | Churches et al. | |
| 6,976,344 B2 | 12/2005 | Sanger | |
| 7,007,431 B2 | 3/2006 | Schubert | |
| 7,121,061 B2 | 10/2006 | Jazzar | |
| 7,147,197 B2 | 12/2006 | Dalton | |
| 2002/0069602 A1 | 6/2002 | Blanchet | |
| 2007/0028531 A1 | 2/2007 | Woodcock | |
| 2008/0060293 A1 | 3/2008 | Hanlon | |
| 2008/0066395 A1 | 3/2008 | Aranda et al. | |

OTHER PUBLICATIONS

Office Action dated Oct. 14, 2011; In related case U.S. Appl. No. 12/319,027, filed Dec. 31, 2008.

Office Action dated Oct. 24, 2011; In related case U.S. Appl. No. 12/317,092, filed Dec. 31, 2008.

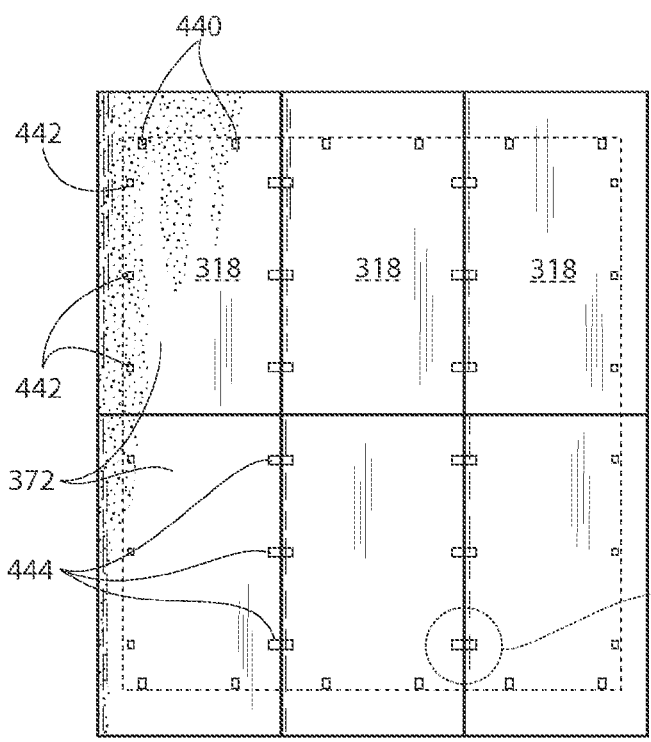
Fig. 34
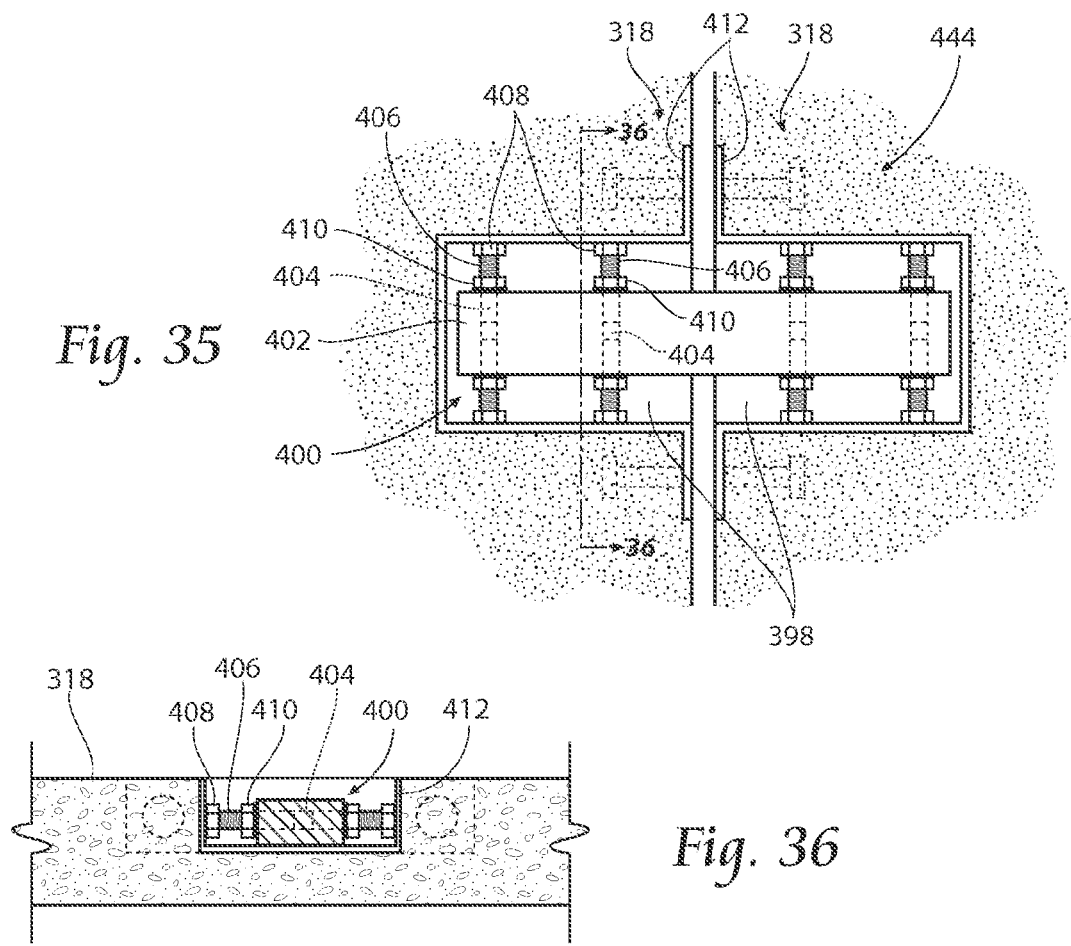
Fig. 35
Fig. 36

MODULAR CONCRETE BUILDING

RELATED APPLICATIONS

This application is a continuation-in-part of co-pending U.S. patent application Ser. No. 12/317,963, filed 31 Dec. 2008.

BACKGROUND OF THE INVENTION

The invention relates to building construction, and more particularly to precast modular buildings.

Most modular housing is in the form of wood frame houses make from prefabricated wall panels, frames, and trusses. A major disadvantage of this type of housing is that the wall panels, frames, and trusses must be constructed with extreme precision in order to ensure the pieces fit together properly on-site.

Prefabricated concrete panels have also been used to provide a modular building. However, many modular homes made of concrete panels utilize either flat concrete roofs or non-concrete roofs.

SUMMARY OF THE INVENTION

The present invention provides devices and methods for assembling a modular concrete building.

One aspect of the invention provides a method for assembling a concrete building including providing a foundation, providing a plurality of support members, providing a plurality of wall panels, providing a plurality of floor panels, providing a plurality of roof panels, placing the plurality of support members on the foundation, placing the plurality of floor panels on the support members, placing the plurality of wall panels on the support members, and placing the plurality of roof panels on the wall panels.

The method may include coupling at least one support member to the foundation.

The method may include the plurality of support members may being at least four support columns and at least four support beams.

The method may include the at least four support beams being at least two end beams and at least two side beams.

The method may include coupling at least one support column to the foundation.

The method may include coupling at least one support beam to an associated support column.

The method may include coupling at least one wall panel to an associated support member.

The method may include coupling at least one wall panel to an associated support beam.

The method may include coupling at least one roof panel to an associated wall panel.

Another aspect of the invention provides a method for assembling a building comprising providing a foundation, providing a plurality of support columns, providing a plurality of support beams, providing a plurality of wall panels, providing a plurality of floor panels, and providing a plurality of roof panels. Each of said support columns having a top surface and a bottom surface, each of said support columns having a cavity formed in the bottom surface thereof. Each of said support beams having a top surface, a bottom surface, an inside surface, an outside surface, and a pair of opposed end surfaces. Each of the wall panels having an inner surface, an outer surface, a top surface, a bottom surface, a first side surface, and a second side surface. Each of said floor panels having a top surface, a bottom surface, a first side surface, a second side surface, a first end surface and a second end surface. Each of said roof panels having a top surface, a bottom surface, a first side, a second side, a first end, and a second end. The method further includes placing the plurality of support columns on the foundation. The method further includes placing the plurality of support beams on the support columns such that the bottom surface of each support beams engages a top surface of a corresponding support beam. The method further includes placing the plurality of floor panels on the support beams such that the bottom surface of each floor panels engages a top surface of a corresponding support beam. The method further includes placing the plurality of wall panels on the support beams such that the bottom surface of each wall panel engages a top surface of a corresponding support beam. The method further includes placing the plurality of roof panels on the wall panels such that a bottom surface of each roof panel engages a top surface of a corresponding wall panel.

The providing a foundation step may include driving a plurality of piles into the ground.

The placing the plurality of support columns on the foundation step may include placing each support column over the piles, such that the piles are located at least partially within the support column cavity.

The method may include securing at least one of the plurality of support columns to the foundation.

The method may include at least one of the support columns having an integral footing, the integral footing having a top surface, at least one exterior side surface, the integral footing having at least on channel extending from the top surface thereof to the cavity formed therein.

The securing at least one of the plurality of support columns steps may include inserting concrete through the channel into the cavity.

The method may include at least two adjacent support columns having at least one bar extending outwardly from the exterior side surface of the integral footing.

The method may include providing at least one grade beam between adjacent support columns.

The method may include the plurality of support beams further including at least two end beams and at least two side beams.

The method may include securing at least one of the support beams to at least one of the support columns.

The method may include each side beam having a ledge formed on the inner surface thereof.

The placing the plurality of floor panels step may include placing a first end of each floor panel on the ledge of a first side beam and placing the second end of each floor panel on the ledge of a second side beam.

The placing the plurality of floor panels step may include securing each floor panel an associated side beam in at least one located.

The placing the plurality of wall panels step may include securing each wall panel to an associated support beam in at least one location.

The method may include the plurality of wall panels including at least two side wall panels and at least two end wall panels.

The method may include each of said side wall panels being secured to a side beam and each of said end wall panels being secured to an end beam.

The placing the plurality of roof members step may include securing each roof member to an associated wall panel in at least one location.

The method may include a first end of each wall panel being coupled to a first side wall and a second end of each wall panel being coupled to a second side wall.

The method may include the plurality of roof panels including at least two end roof panels.

The method may include each end roof panel having a stem section outwardly from the bottom surface of the end panel.

The placing the plurality of roof panels step may include placing each end roof panel such that a bottom surface of the stem section engages the top surface of an associated end wall panel.

The method may include the plurality of roof panels including at least one inner roof panel.

The method may include coupling at least one roof panel to an adjacent roof panel in at least one location.

The method may include caulking between at least one set of adjacent panels.

Another aspect of the invention provides a method for assembling a concrete building including providing a foundation, providing a plurality of support columns, providing a plurality of support beams, providing a plurality of wall panels, providing a plurality of floor panels, and providing a plurality of roof panels. Each of the support columns having a top surface and a bottom surface and a cavity formed in the bottom surface thereof. Each of the support beams having a top surface, a bottom surface, an inside surface, an outside surface, a pair of opposed end surfaces, and a ledge extending from the inside surface, and the ledge having an inside surface, an top surface, and a bottom surface each of the wall panels having an inner surface, an outer surface, a top surface, a bottom surface, a first side surface, and a second side surface. Each wall panel having at least one securing member extending from the bottom surface and at least one fixation member extending from the top surface. Each support beam further having at least one bore formed in the top surface for receiving the at least one securing member of a corresponding wall panel. Each of the floor panels having a top surface, a bottom surface, a first side surface, a second side surface, a first end surface and a second end surface. Each of the roof panels having a top surface, a bottom surface, a first side, a second side, a first end, and a second end, and further having an aperture formed in the bottom surface for receiving the at least one fixation member of a corresponding wall panel. The method further includes placing the plurality of support columns on the foundation, placing the plurality of support beams on the support columns such that the bottom surface of each support beams engages a top surface of a corresponding support column, placing the plurality of floor panels on the support beams such that the bottom surface of each floor panels engages a top surface of the ledge on a corresponding support beam, placing the plurality of wall panels on the support beams such that the securing member extending from the bottom surface of each wall panel engages the bore formed in the top surface of a corresponding support beam; and, placing the plurality of roof panels on the wall panels such that the fixation means on the top surface of each roof panel engages the aperture formed in the bottom surface of a corresponding roof panel.

The method may include roof panels that are substantially flat.

The method may include the plurality of roof panels having at least one aperture extending from the top surface to the bottom surface for receiving the at least one fixation member.

The placing the plurality of roof members step may include securing each roof member to an associated wall panel in at least one location.

The method may include securing each roof member to an associated wall panel by filling the aperture with non-shrinking grout to thereby secure the fixation member in the aperture.

The method may include securing each roof member to an associated wall panel by securing said fixation member within said aperture by securing a locking member on a distal end of the fixation member.

The method may include the plurality of roof panels having a layer of insulation, said layer of insulation having a first end surface and a second end surface, corresponding with the first end surface and the second end surface of the roof panels.

The method may include the layer of insulation being tapered in thickness from a first end surface to a second end surface.

The placing the plurality of roof members step may include placing the plurality of roof members in a tilted position, such that a first end surface or side surface at a first side wall is higher in elevation than a second, opposing end surface or side surface at an opposing side wall.

The method may include providing a wood blocking coupled to either the first or the second end surface of both the insulation and the roof panel.

The method may include the wood blocking being coupled to the roof panel by a concrete anchor.

The method may include the roof panel having an end cap apparatus that is coupled to and around the wood blocking.

The method may include the end cap apparatus having a flushing bracket configured to be positioned around the wood blocking, said flushing bracket terminating at a bottom section in a drip element, and a flushing cap.

BRIEF DESCRIPTION OF THE DRAWINGS

FIG. 34 is a top plan view of the modular building of FIG. 22.

FIG. 35 is a close-up top plan view of a portion of the modular building of FIG. 22.

FIG. 36 is a sectional view taken along line 15-15 of FIG. 35.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structures. While the preferred embodiment has been described, the details may be changed without departing from the invention, which is defined by the claims.

Figure 1:
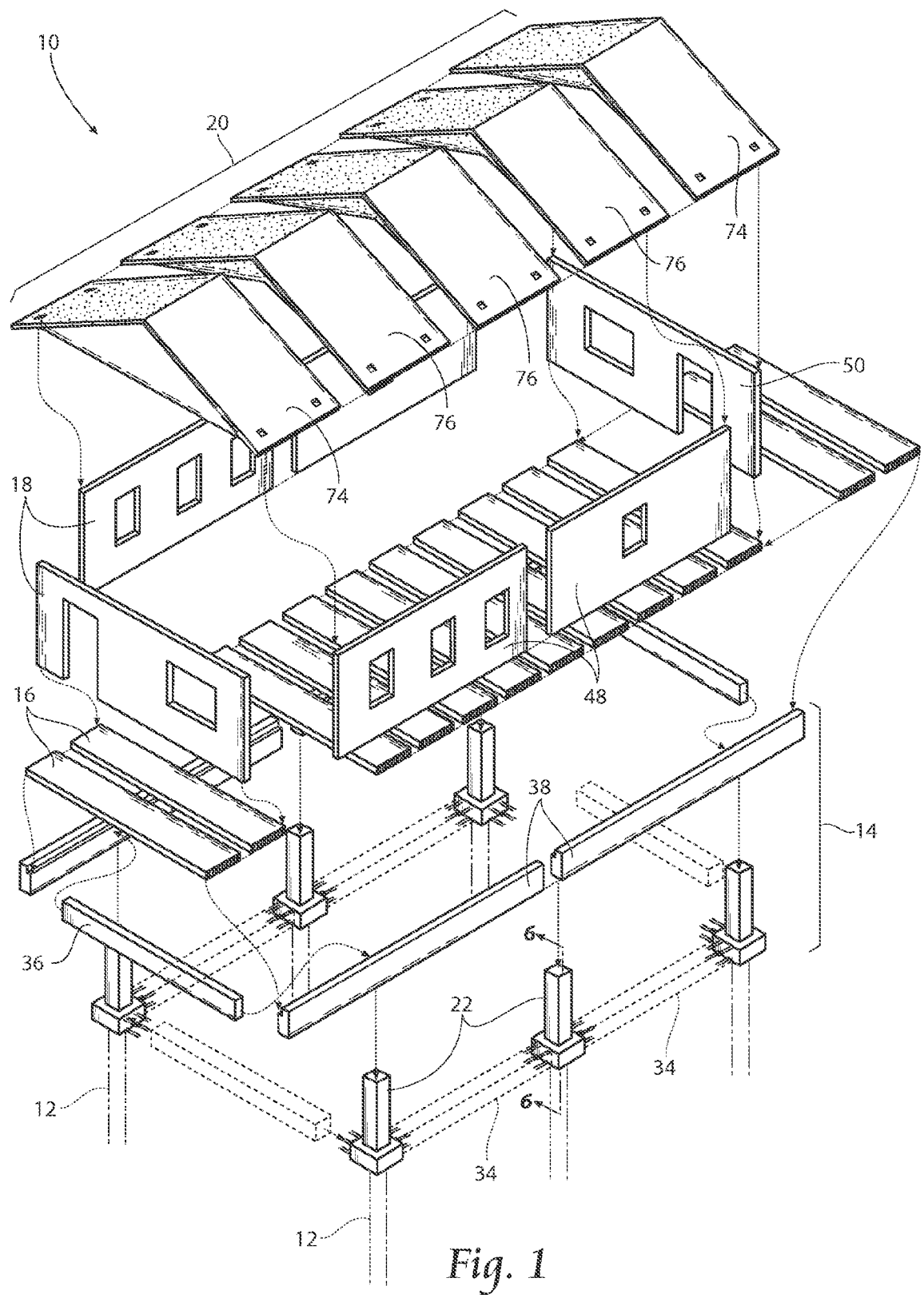
FIG. 1 is a perspective exploded view of an embodiment of a modular building according to the present invention.
Figure 2:
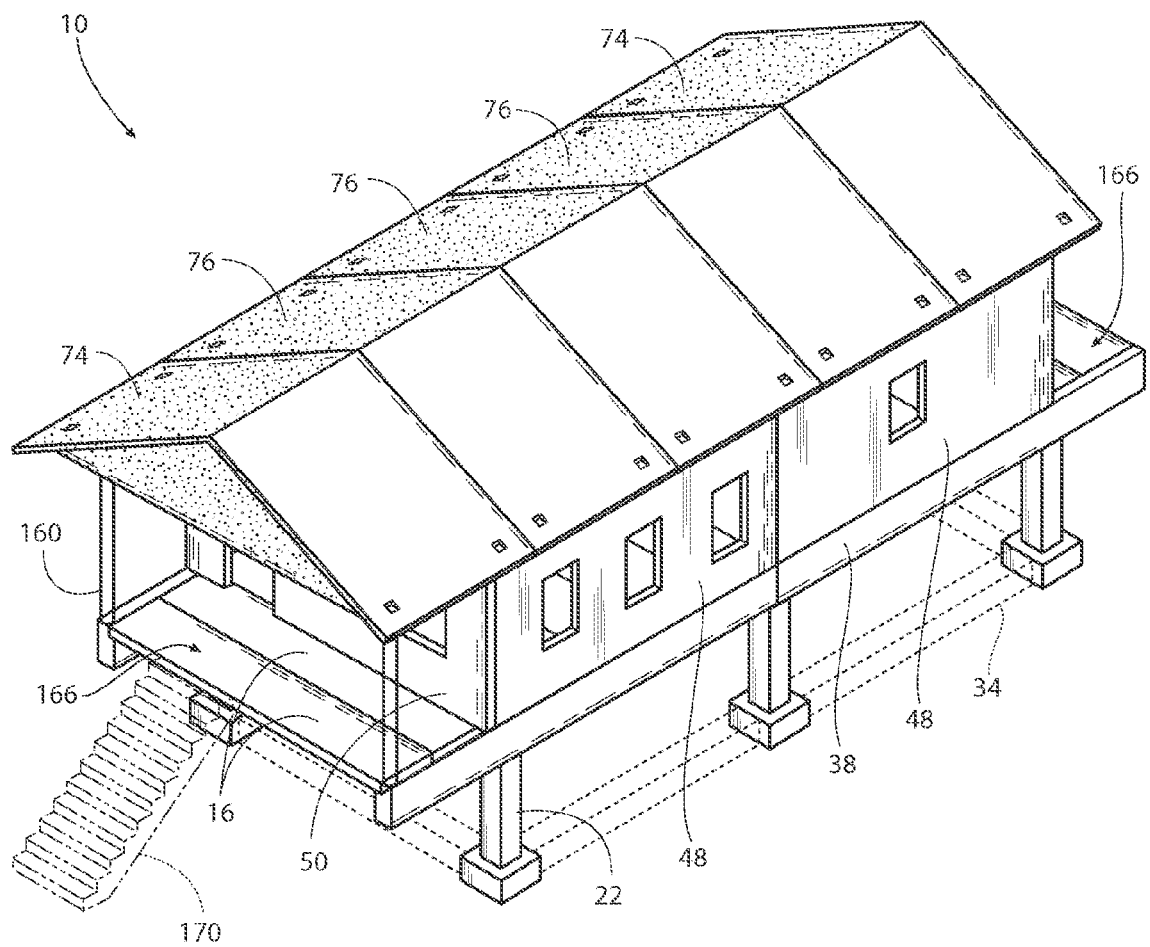
FIG. 2 is a perspective view of the building of an alternative embodiment of a modular building according to the present invention.
Figure 3:
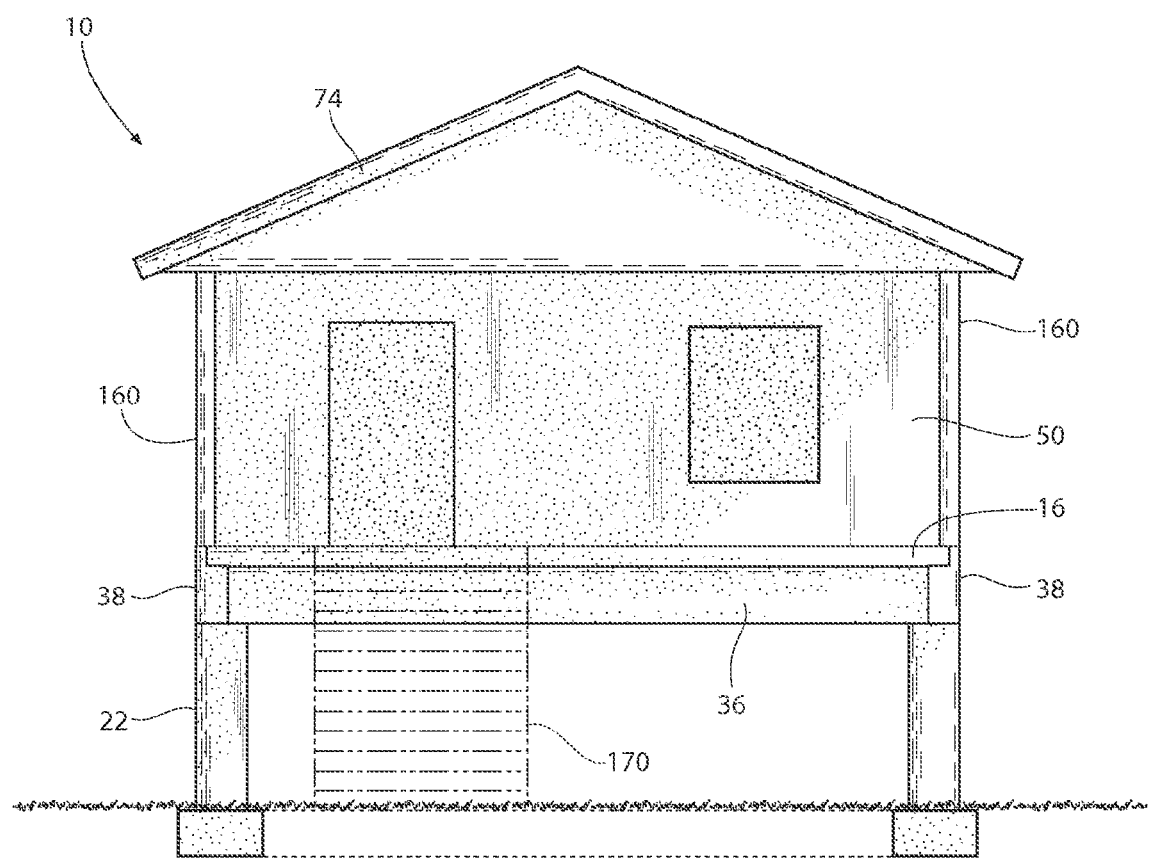
FIG. 3 is a front plan view of the building of FIG. 2.

FIG. 1 shows an embodiment of a modular concrete building 10. The building preferably includes a foundation 12, a plurality of support members 14, a plurality of floor panels 16, a plurality of wall panels 18, and a plurality of roof panels 20.

The foundation 12 may take any form known in the art. In the illustrated embodiment shown in FIG. 1, the foundation 12 includes a plurality of piles which may be driven into the ground. It should be understood that the depth of the piles will be determined by the particular design of the building 10 to be supported by the piles and the conditions at the building site.

Figure 6:
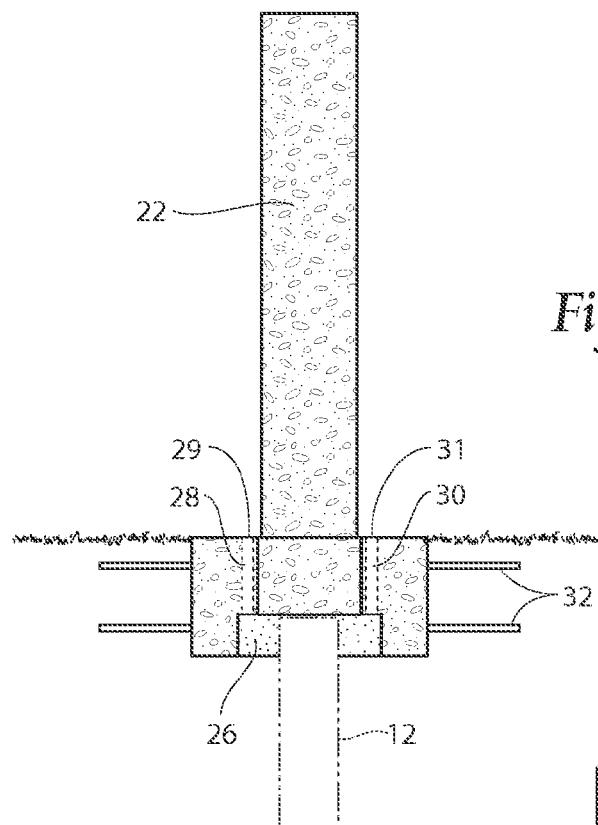
FIG. 6 is a sectional view taken along line 6-6- of FIG. 1.

The building 10 preferably includes a plurality of support members 14 as shown in FIGS. 1 and 6. In the illustrated embodiment the support members 14 take the form of support columns 22. The support columns 22 preferably include an integral footing 24. The footing 24 preferably includes a cavity 26 as shown in FIG. 6. The cavity 26 preferably includes a first channel 28 leading to a first opening 29 on the top surface of the footing 24 and a second channel 30 leading to a second opening 31 on the top surface of the footing 24. In use, the cavity 26 may be filled with a securing agent, such as non-shrink grout, through either the first 29 or second 31 opening to secure the support column 22 to the foundation 12. It is further contemplated that the integral footing 24 may include only one channel 28 between the top surface of the footing 24 and the cavity 26.

Each support column 22 may include at least one bar 32 extending outwardly from at least one surface of the footing 24. As shown in FIG. 1, preferably the bars 32 extend outwardly from opposed surfaces for interior support columns 22 and outwardly from adjacent surfaces for corner columns 22. In this manner, the bars 32 may be utilized to couple the support columns 22 to the poured ground beam 34 which extend between the support columns 22 as will be described in more detail below.

Figure 25:
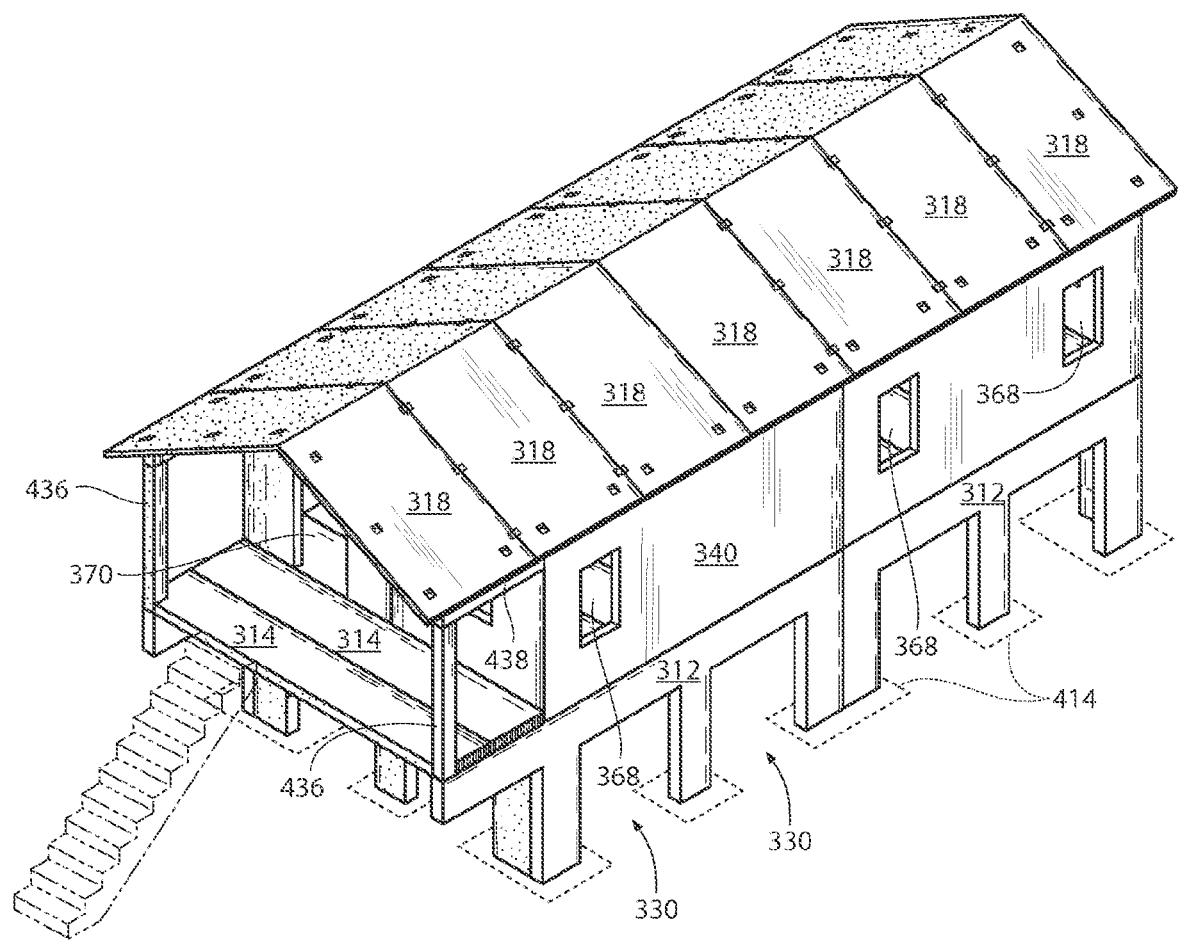
FIG. 25 is a perspective view of an additional alternative embodiment of a modular building according to the present invention including a foundation and staircase in phantom.
Figure 29:
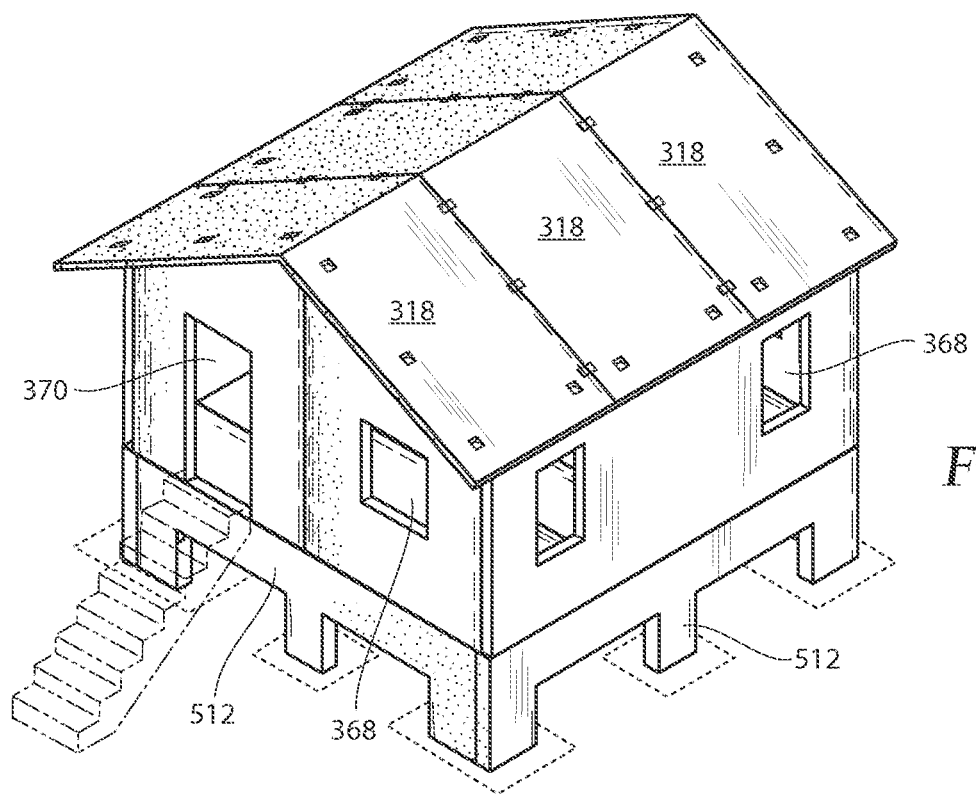
FIG. 29 is a perspective view of an additional alternative embodiment of a modular building according to the present invention including a foundation and staircase in phantom.
Figure 30:
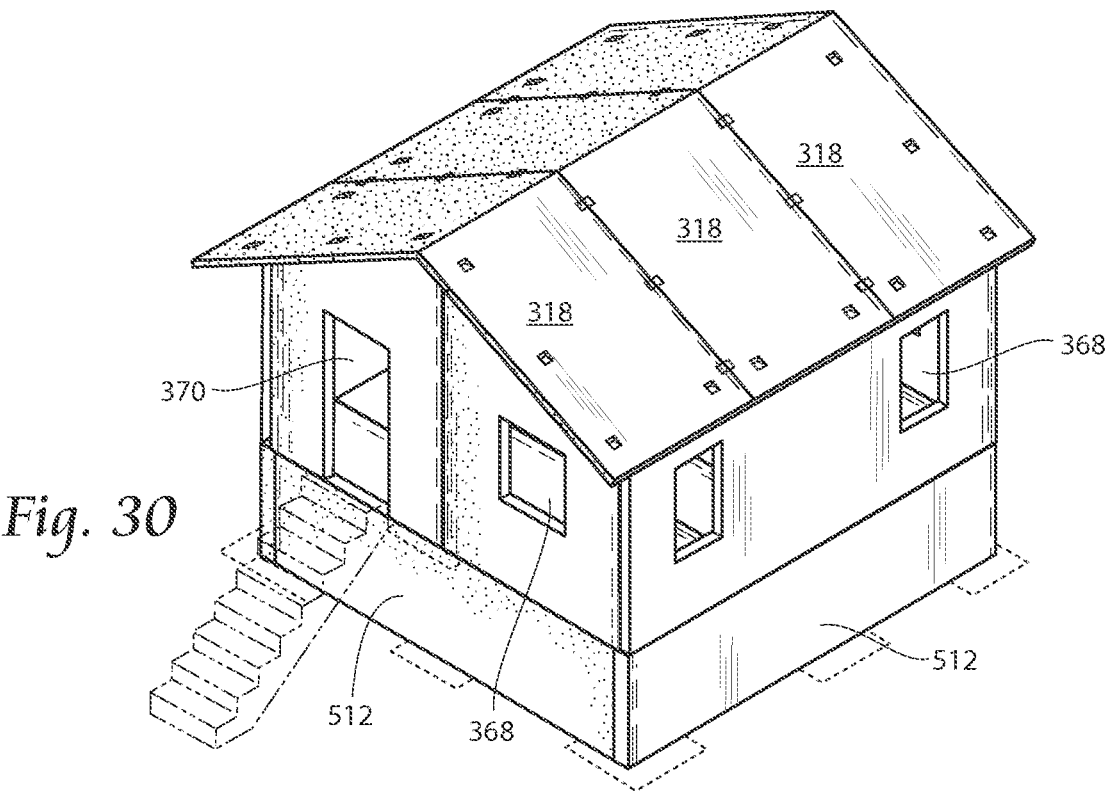
FIG. 30 is a perspective view of an additional alternative embodiment of a modular building according to the present invention including a foundation and staircase in phantom.

However, it should be understood that the support members 14 may take any form known in the art, including, but not limited to panels 12,212 and 312 as shown in FIGS. 25, 29 and 30, respectively. It should be understood the support columns 22 both support the load of the building 10 and raise the building 10 off the ground. This is particularly important in buildings 10 build in flood prone areas. It should be understood that the height of the support columns 22 may be determined by the particular design of the building 10 to be supported by the foundation 12 and the conditions at the building site.

As shown in FIG. 1, in the illustrated embodiment the support members 14 further comprise a plurality of beams 36,38 coupled to the support columns 22. The connection between the beams 36,38 and the support columns 22 will be described in more detail below.

Preferably, each of the plurality of floor panels 16 is a concrete panel. The concrete panel may be precast or may be sitecast. Each of the plurality of floor panels 16 may be a pre-stressed concrete panel. It should be understood that the particular type of concrete to be used will depend upon the application and the span of the floor panel 16, as is known in the art. Each of the floor panels 16 preferably has a generally rectangular configuration. Each of the floor panels 16 preferably has a top surface 40, a bottom surface 42, a pair of side surfaces 44, and a pair of end surfaces 46. Although the illustrated embodiment shows a precast concrete panel, the floor may be of any type known in the art including, but not limited to poured concrete slab with or without post-tension or steel pan with concrete infill.

Preferably, each of the plurality of wall panels 18 is a concrete panel. The concrete panel may be precast or may be sitecast. Each of the plurality of floor panels 16 may be a pre-stressed concrete panel. The plurality of wall panels 18 preferably includes at least two side wall panels 4 8 and at least two end wall panels 50. The side wall panels 48 preferably have a generally rectangular configuration. Each side wall panel 48 includes an inner surface 52, an outer surface 54, a top surface 56, a bottom; surface 58, and a pair of side surfaces 60. It is contemplated that is may be desirable to form the exterior portion 54 of the wall panels 18 may be formed with a texture or pattern. The pattern or texture may take any configuration including, but not limited to a simulated siding, brick, and/or stone texture.

Preferably, each of the plurality of roof panels 20 is a concrete panel. The concrete panel may be precast or may be sitecast. Preferably, the roof panels 20 are not pre-stressed. concrete panels. Each roof panel 20 preferably includes a pair of generally planar roof members 62.

Each roof member 62 is generally rectangular and has an outer surface 64, an inner surface 66, a medial surface 68, an end surface 70, and a pair of opposed side surfaces 72. Preferably, a pair of roof members 62 are integrally at their medial surfaces 68 to form a peak as shown in FIG. 1. It is contemplated that is may be desirable to form the exterior portion 64 of the roof panels 18 may be formed with a texture or pattern. The texture may take any desired configuration including, but not limited a simulated shingled texture.

The illustrated embodiment includes two types of roof panels 20, an end roof panel 74 and an inner roof panel 76. As shown in FIG. 1, each end roof panel 75 includes a stem panel 78 which comprises a portion of the side of the building 10. In use, an end roof panel 74 is preferably used at both the front end and the rear end of the building 10.

Figure 13A:
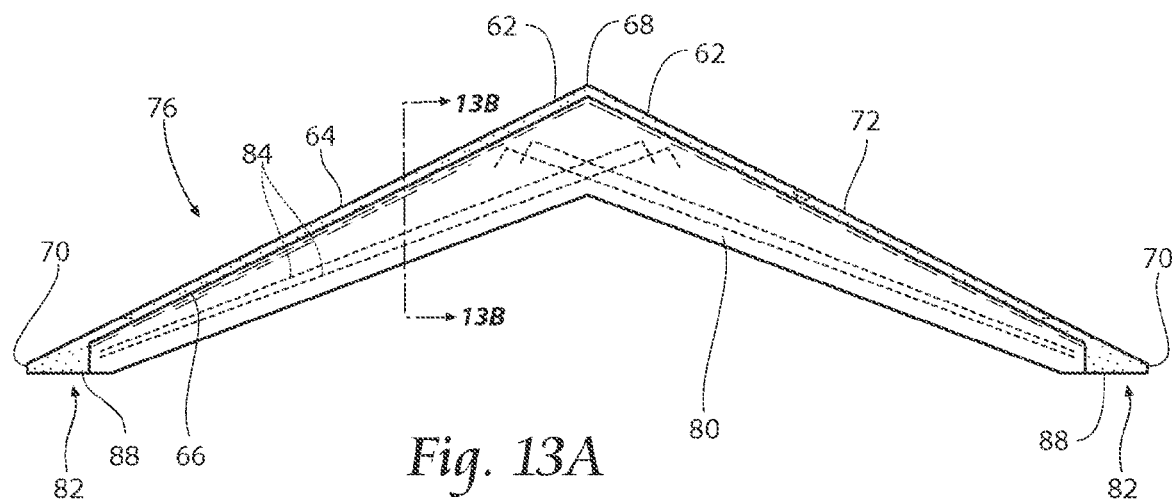
FIG. 13A is a side view of an inner roof panel according to an embodiment of the present invention.
Figure 13B:
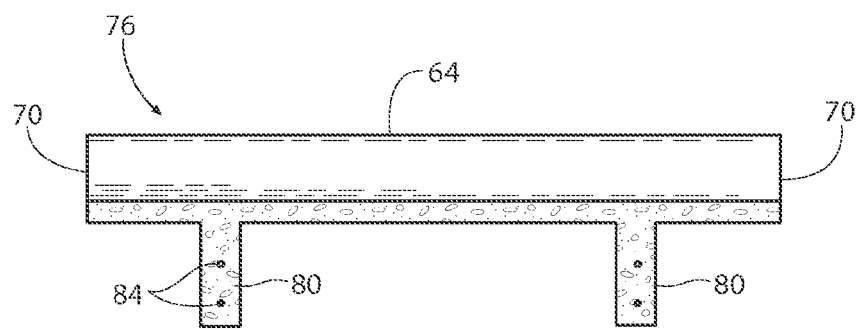
FIG. 13B is a sectional view taken along line 13B-13B of FIG. 13A.
Figure 13C:
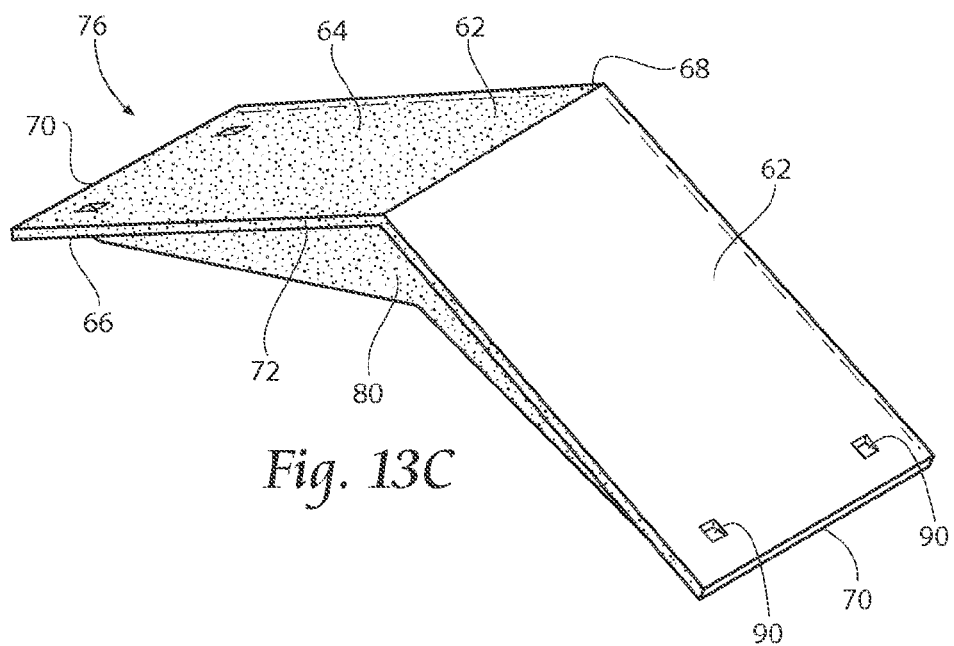
FIG. 13C is a perspective view of the inner roof panel of FIG. 13A.

Each roof member 62 preferably includes at least one rib 80 as shown in FIGS. 13A and 13B. Preferably, each rib 80 extends along the inner surface 66 of each roof member 62 from the medial surface 68 to an attachment portion 82 formed near the end surface 70. Each rib 80 preferably includes at least one stiffening member 84. In the illustrated embodiment each rib 80 includes two stiffening members 84. The stiffening members 84 may take the form of rebar or any other type known in the art. Preferably, each roof member 62 includes at least one stiffening member 86. In the illustrated embodiment the stiffening member 86 takes the form of mesh as is known in the art.

It is contemplated that each end roof panel 74 may include one rib 80 on each roof member 62 (see FIG. 12B) while each inner roof panel 75 may include a pair of ribs 80 on each roof member 62(see FIG. 13B). However, it should be understood that any number of ribs 80 may be utilized.

Figure 12A:
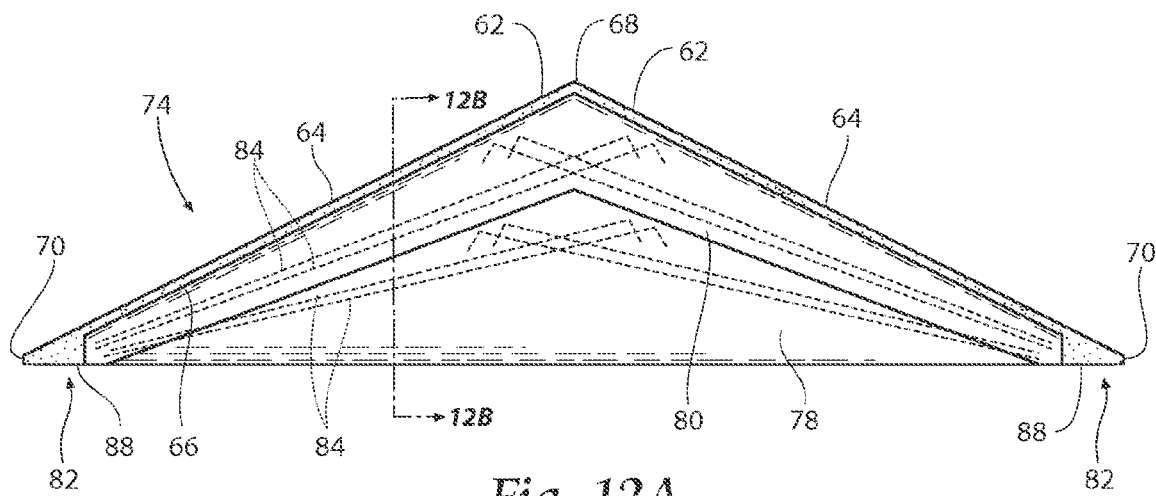
FIG. 12A is a side view of an end roof panel according to an embodiment of the present invention.
Figure 12B:
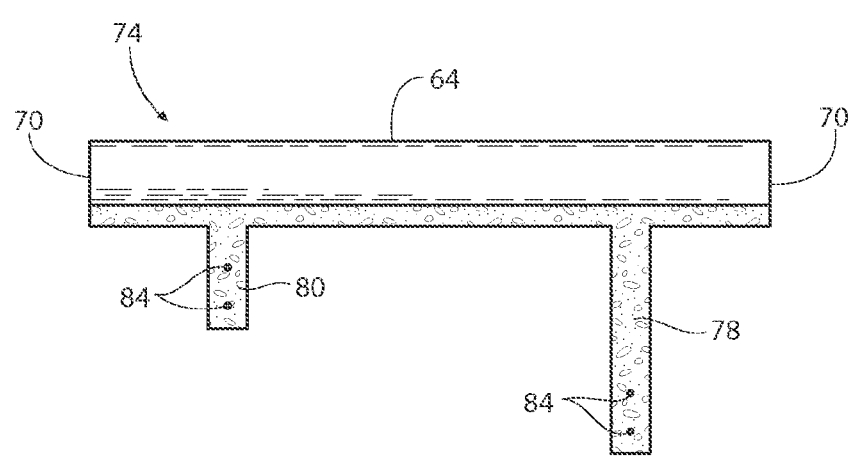
FIG. 12B is a sectional view taken along line 12B-12B of FIG. 12A.
Figure 12C:
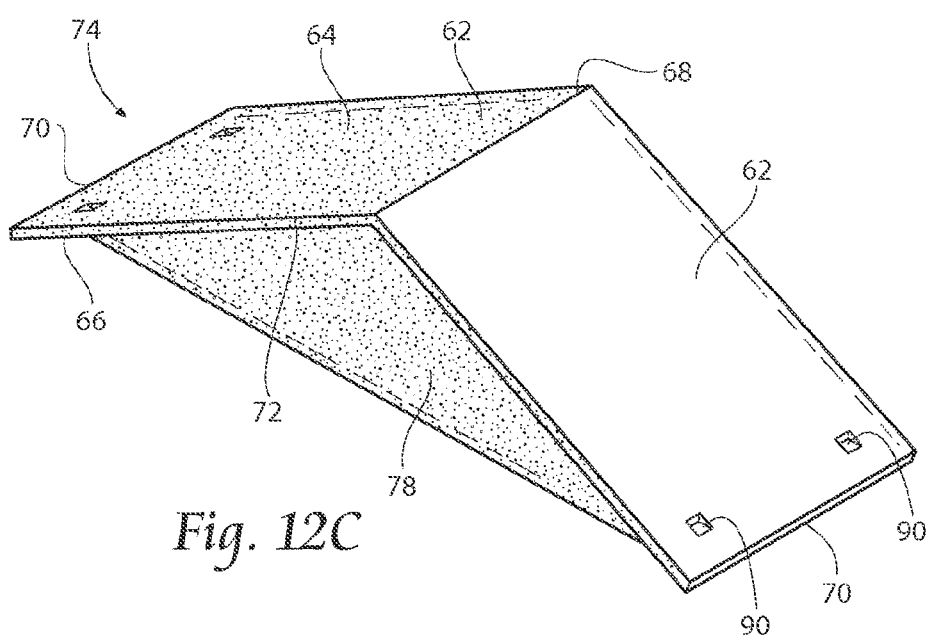
FIG. 12C is a perspective view of the end roof panel of FIG. 12A.

As seen in FIGS. 12A and 13A it is further contemplated that at least one attachment portion 82 may be formed on each roof member 62. As shown in FIGS. 12A and 13A, the attachment portion 82 is preferably located near the end surface 70 of each roof member 62. The attachment portion 82 preferably includes a flattened portion 88 on the inner surface 66 of each roof member 62, the flattened portion 88 being sized and configured to mate with the top surface of a wall panel 18.

Figure 14:
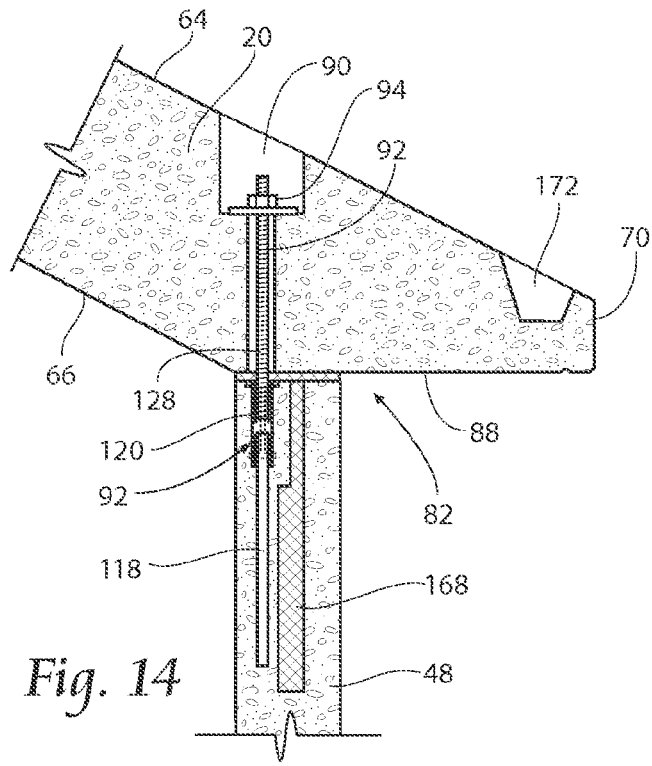
FIG. 14 is a cross sectional view of a joint between a roof panel and a side wall panel of a building according to the present invention.

As seen in FIG. 14, the attachment portion 82 may further include a cavity 90 formed in the outer surface 64 of the roof member 62. The cavity 90 is preferably sized and configured to accommodate a fixation member 92 such as a threaded rod and a locking member 94 such as a locking nut.

To construct a building 10 using the above described foundation 12, support members 14, floor panels 16, wall panels 18, and roof panels 20, the foundation 12 is first laid. In the illustrated embodiment the foundation 12 comprises a plurality of piles which are driven into the ground at the construction site. In the illustrated embodiment six (6) piles are driven into the ground. As is known in the art, the depth the piles are driven into the ground will depend on the soil conditions at the construction site. After the piles are driven into the ground, the piles are preferably cut to a uniform height.

The support members 14 are then coupled to the foundation 12. In the illustrated embodiment the support members 14 comprise a plurality of support columns 22 and a plurality of beams 36,38. The support columns 22 are preferably placed on the exposed portion of the foundation. A securing agent, such as, but not limited to non-shrink grout is inserted into the cavity 26 in the support column footing. The securing agent is preferably inserted into the cavity 26 through the first channel 28. When the cavity 26 is filled, the excess securing agent will exit the cavity through the second channel 30, giving a visual indication to the installer that the cavity 26 is full.

A grade beam 34 may then be poured. The grade beam 34 may be poured in any manner known in the art. For example, and not by way of limitation, temporary forms may be utilized to form the grade beams 34. Preferably, the grade beam 34 is pour around the support column rods 22. In this manner as the concrete cures, the grade beams 34 are coupled to the adjacent support columns 22.

Figure 7:
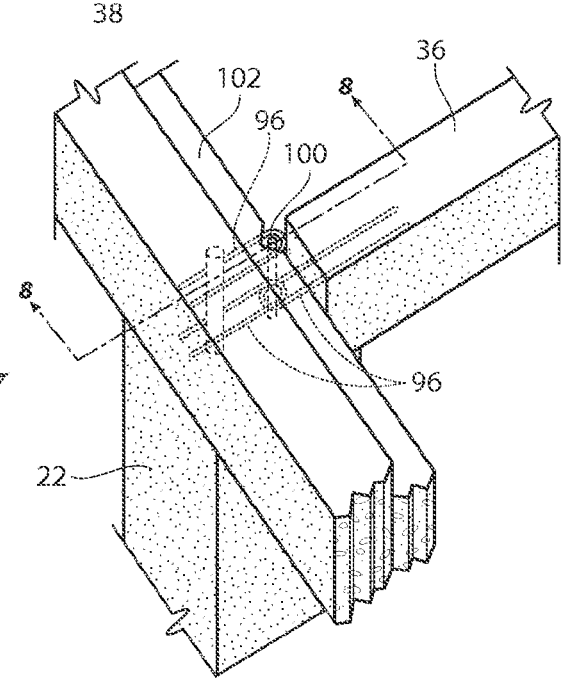
FIG. 7 is a close-up view of a joint between a support column, a side beam, and an end beam.
Figure 8:
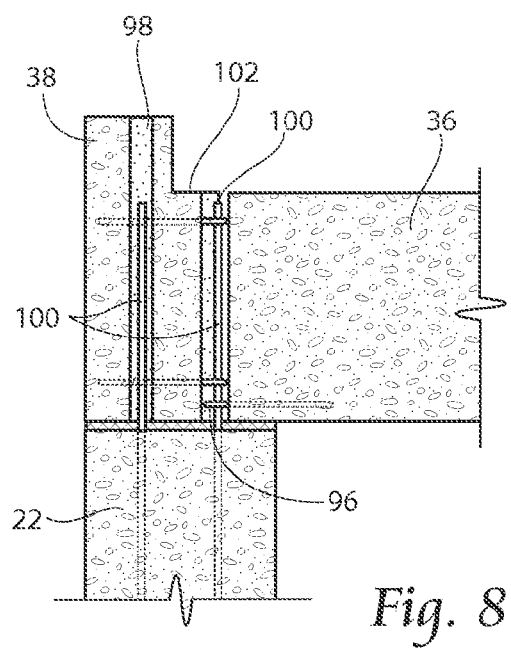
FIG. 8 is a sectional view taken along line 8-8 of FIG. 7.

The beams 36,38 may then be set on top of the support columns 22. The beams 36,38 may be coupled to the support columns 22 using any means known in the art. As shown in FIG. 7, in the illustrated embodiment each end beam 36 preferably includes at least one loop 96 extending from each end surface thereof. Further, each side beam 38 preferably includes at least one loop 96 extending from the inside surface thereof. Each side beam 38 preferably further includes at least one aperture 98 extending therethrough from the top surface to the bottom surface thereof. Preferably, at least one loop 96 and at least one aperture 98 are formed at various locations along the length of each side beam 38. Preferably at least one loop 96 and at least one aperture 98 are formed at each location the side beam 38 engages a support column 22. Preferably, each support column 22 has a pair of rods 100 projecting from the top surface thereof. The rods 100 may take any form known in the art including, but not limited to rebar or coil rod.

As each beam 36,38 is placed on each support column 22, the loops 96 protruding from the beams 36,38 are aligned with the first support column rod 100 and the aperture 98 in the side beam 38 is aligned with the second support column rod 100 as shown in FIG. 7.

Figure 9A:
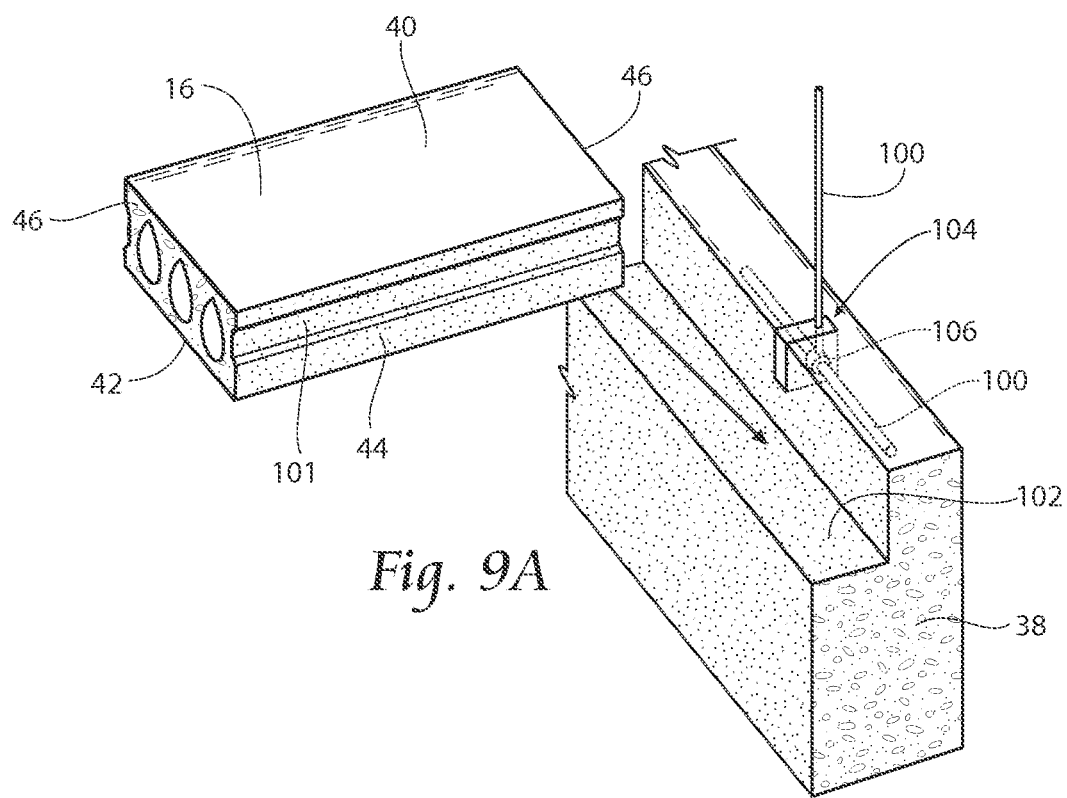
FIG. 9A is a close-up perspective view of a joint between a beam and a floor panel with a floor panel connection member in the "up" position.
Figure 9B:
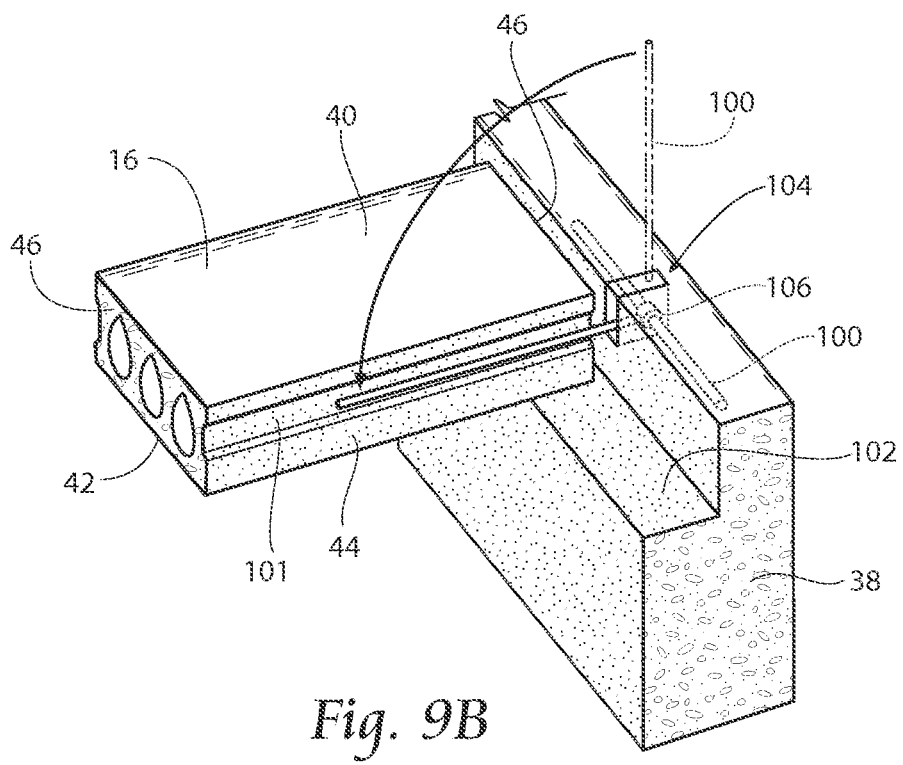
FIG. 9B is a close-up perspective view of a joint between a beam and a floor panel with a floor panel connection member in the "down" position.
Figure 10:
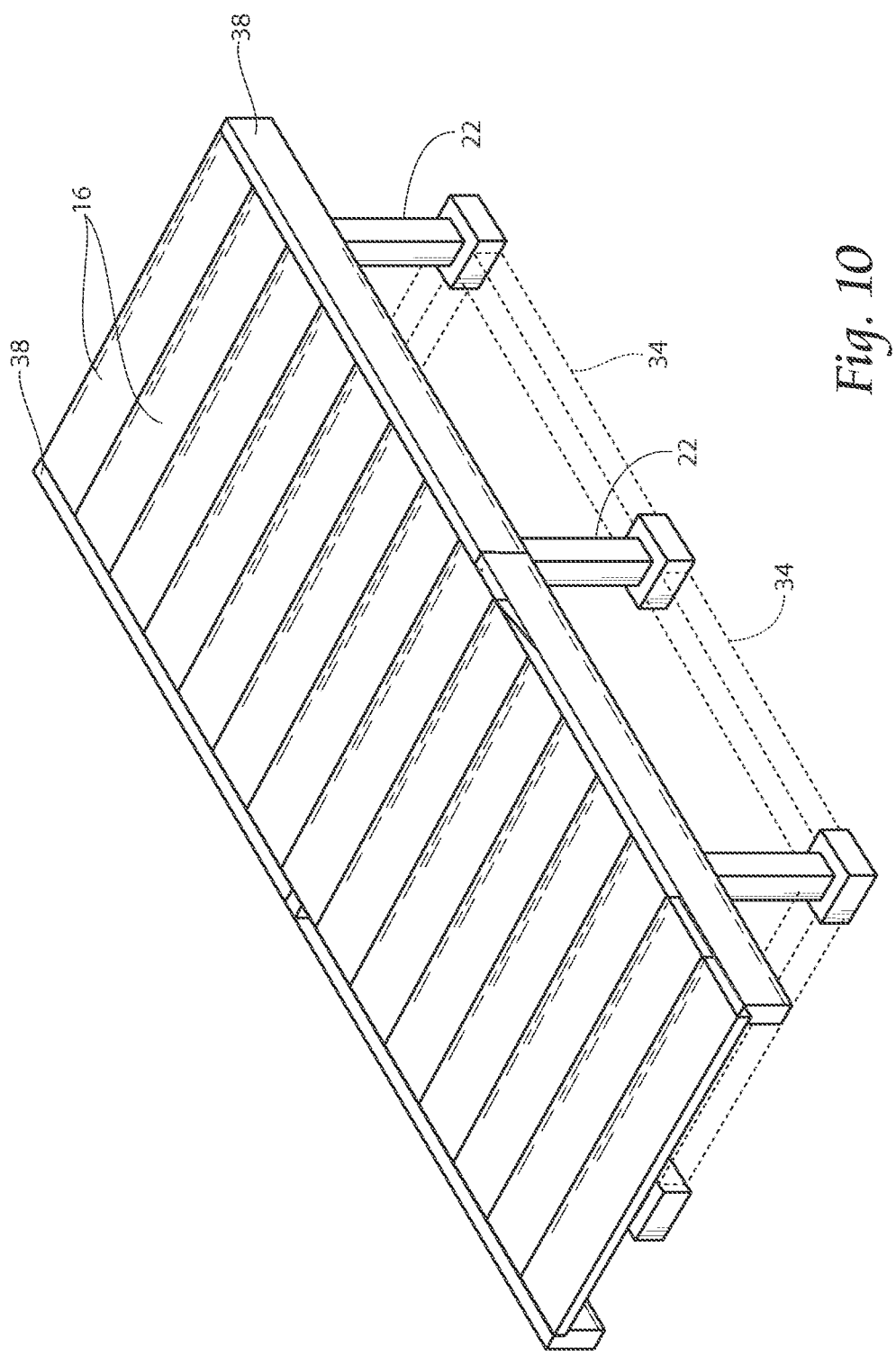
FIG. 10 is partial assembly of the building of FIG. 1 including support members and floor panels.

The plurality of floor panels 16 may then be set on top of the support members 14. In the illustrated embodiment the floor panels 16 extend As shown in FIGS. 9A and 9B, preferably each side beam 38 includes a ledge 102 on an inside surface thereof. The ledge 102 is preferably cast in the beam 38 during production. A first end 46 of each floor panel 16 is placed on the ledge 102 of the first side beam 38 and the second end 46 of each floor panel 16 is placed on the ledge 102 of the second side beam 38.

Each of the side beams 38 includes at least one connection member 104 as shown in FIGS. 9A and 9B. The connection member 104 includes a first rod 100 and a rotating member 106 rotatably coupled to the first rod 100. A second rod 100 is coupled to the rotating member 106 such that the second rod 100 is free to rotate relative to the first rod 100. The first and second rod 100 may take any form known in the art including, but not limited to rebar or coil rod. The rotating member 106 may take any form known in the art including, but not limited to a coil nut. Preferably, each of the connection members 104 is cast in a side beam 38 during production of the side beam 38. The side beam 38 preferably includes a cavity 108 formed around the rotating member 106 to allow the second rod 100 to rotate. The cavity 108 may be filled with a removable piece of insulation during casting. The second rod 100 is preferably cast in the "upright" position as shown in FIG. 9A.

In use, when a first floor panel 16 is set in place, the second rod 100 at the first end 46 and the second end 46 of the floor panel 16 are rotated to their "down" position as shown in FIG. 9A. As is shown in FIGS. 9A and 9B, each floor panel 16 preferably has a recess 110 formed in each side surface 44 thereof. As will be understood, a small cavity will be formed when adjacent floor panels 16 are set in place next to each other. These recesses 110, and resulting cavity, are preferably sized and configured to accommodate the second rod 100. An adjacent floor panel 16 may then be put in place. After floor panels 16 are set in place, the joints between adjacent floor panels 16, particularly the cavity formed between the side surfaces 44 of the floor panels are preferably filled with grout.

It is further contemplated that in some circumstances it may be desirable to pour a leveling topping over the floor panels 16.

Figure 11A:
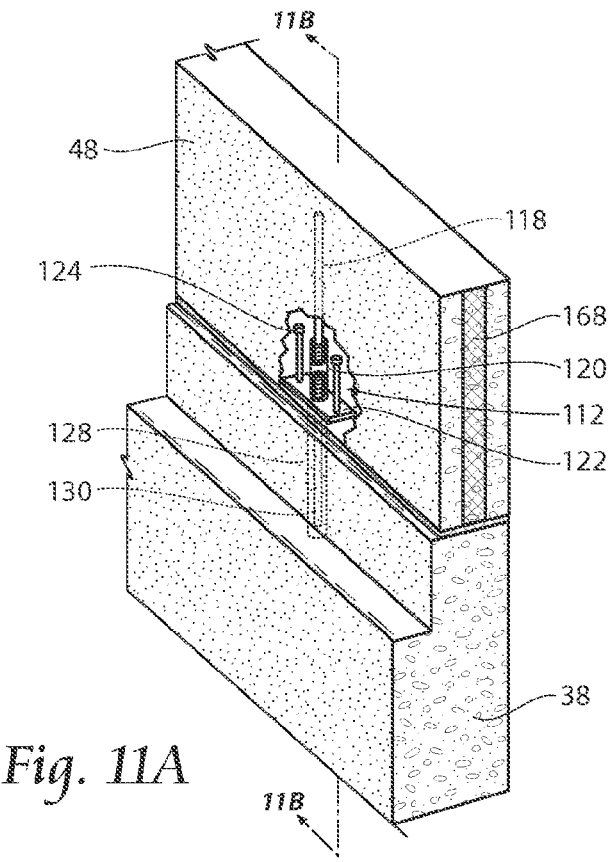
FIG. 11A is a close-up perspective view of a joint between a side wall panel and a side beam.
Figure 11B:
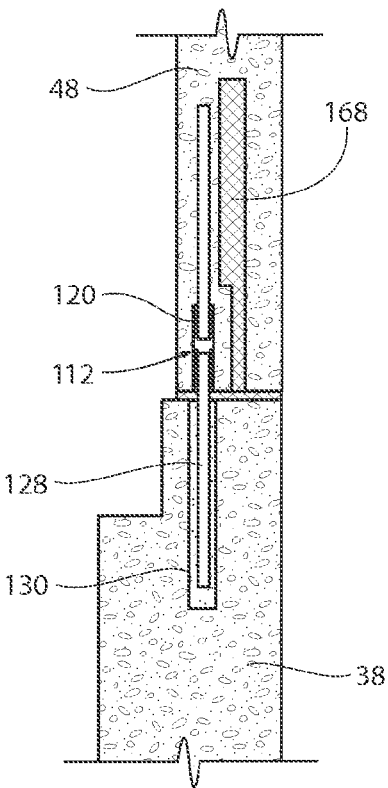
FIG. 11B is a sectional view taken along line 11B-11B of FIG. 11A.

The plurality of wall panels 18 may then be set on top of the support members 14. Each of the plurality of side wall panels 48 may be attached to an associated side beam 38 as shown in FIGS. 11A and 11B. Each of the plurality of end wall panels 50 may be attached to an associated end beam 36 as shown in FIG. 11C.

Figure 11C:
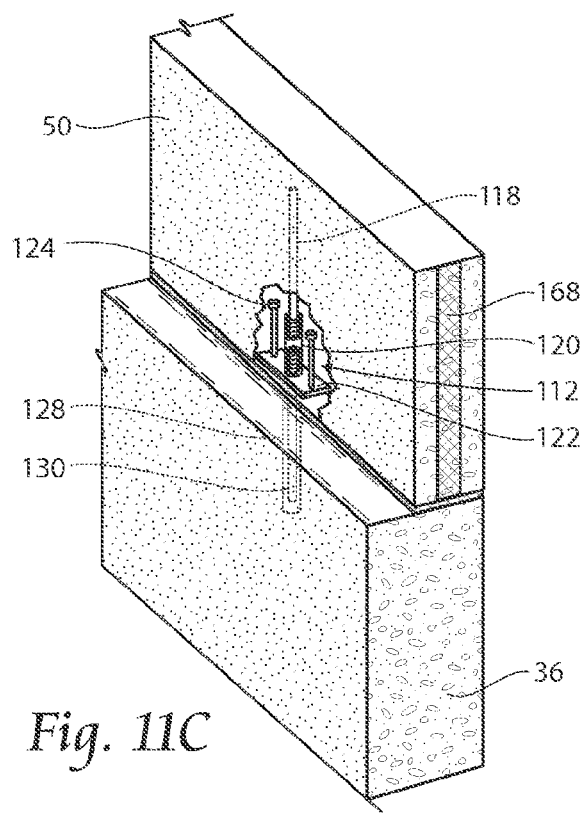
FIG. 11C is a close-up perspective view of a joint between an end wall panel and an end beam.

Preferably, each wall panel 18 includes at least one securing member 112 disposed in the bottom surface 58,114 thereof as shown in FIGS. 11A and 11C. In the illustrated embodiment the securing member 112 takes the form of first rod 118 coupled to an insert 120. The first rod 118 may take any form known in the art including, but not limited to a coil rod. The insert 120 may take any form in the art including, but not limited to a coil insert. Preferably, the insert 120 has an interior threaded surface. The insert 120 may be coupled to a first surface of a plate 122, by welding or any other means known in the art. The plate 122 may include at least one projection 124 extending from the first surface of the plate 122. The plate 122 preferably includes an aperture 126 therethrough, the aperture 126 being aligned with the insert 120 to allow a second rod 128 to be inserted through the plate 122 and into the insert 120 as shown in FIGS. 11A and 11C. The second rod 128 may take any form known in the art including, but not limited to a coil rod. The securing member 112 is preferably cast in the end wall panel 18 during production of the end wall panel 18.

A bore 130 extends into each beam 36,38 at the site of the associated wall panel 16 securing member 112. The bore 130 may be cast in the beam 36,38 during production or may be drilled. The bore 130 is preferably sized and configured to accept the second rod 128. If The bore 130 is preferably filled with an adhesive substance, including but not limited to non-shrink grout. As each wall panel 18 is placed on a beam member 36,38, the second rod 128 is aligned with an associated bore 130 and placed into the bore 130.

The plurality of roof panels 20 may then be placed on top of the wall panels 18. Each roof panel 20 may then be coupled to the adjacent wall panels 18 using any means known in the art. In the illustrated embodiment each of the roof panels 20 is coupled to the adjacent side wall panels 48 as shown in FIG. 14 and each of the end roof panels 74 is coupled to an adjacent end wall panel 50 as shown in FIG. 15.

As shown in FIG. 14, each side wall panel 48 preferably includes at least one fixation member 92 disposed in the top surface 56 thereof. The fixation member 92 may take any form known in the art, including, but not limited to at least one rod 128. In the illustrated embodiment the fixation member 92 takes the form of a pair of rods 118,128 coupled by an insert 120. As shown in FIG. 14, the second rod 128 of the wall panel fixation member 92 extends outwardly from the top surface 56 of the side wall panel 48. The roof panel 20 preferably includes an aperture 98 extending therethrough. The aperture 98 is preferably sized and configured to allow the fixation member 92 to extend therethrough. The roof panel 20 preferably includes a cavity 90 formed in the outer surface 64 thereof as shown in FIG. 14. The cavity 90 is preferably sized and configured to allow a locking member 94, such as a nut to be attached to the free end of the fixation member 92.

As described above, if desired, the aperture 98 may be filled with an adhesive substance, including but not limited to non-shrink grout. As each roof panel 20 is placed on a side wall panel 48, the second fixation member 92 is aligned with an associated aperture 98 and placed through the aperture 98. A locking member 94, such as a nut, may then be secured to the free end of the fixation member 92. If desirable, the cavity 90 may be filled with an adhesive substance, such as, but not limited to, non-shrink grout.

Figure 15A:
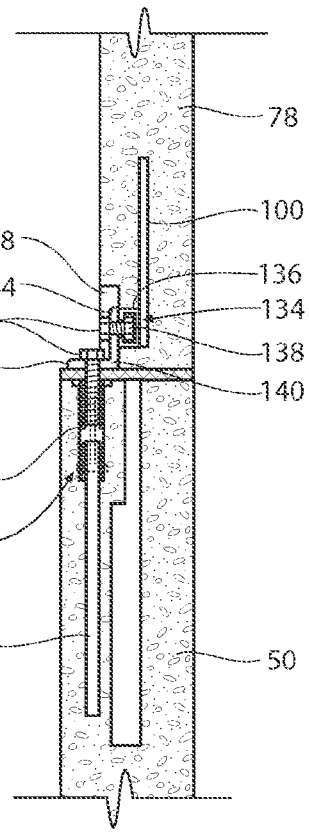
FIG. 15A is a cross sectional view of a joint between an end roof panel stem and an end wall panel of a building according to the present invention.
Figure 15B:
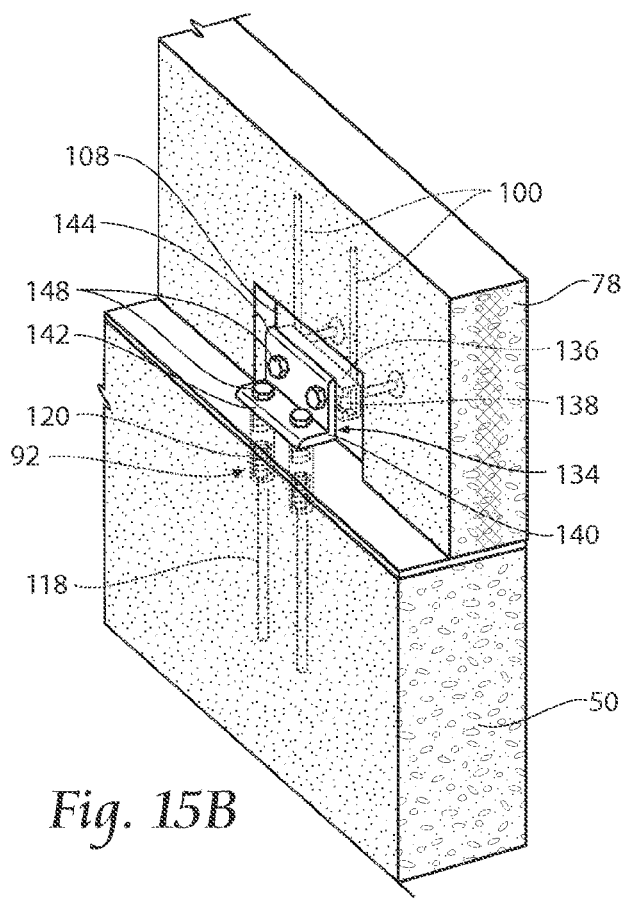
FIG. 15B is a perspective view of the joint between an end roof panel stem and an end wall panel of FIG. 15A.

Preferably, each end wall panel 50 includes at least one fixation member 92 disposed in the top surface 116 thereof as shown in FIG. 15. In the illustrated embodiment the fixation member 92 takes the form of rod 128 coupled to an insert 120. The fixation member 92 is preferably cast in the wall panel 50 during production. It is contemplated that two spaced apart fixation members 92 may be disposed in the top surface 116 of the end wall panel 50 at each fixation location.

Preferably a cavity 108 is formed in the inner surface of the stem panel 78 near the lower surface 132 of the stem panel.

Preferably, each stem panel 78 includes at least one stem fixation device 134 disposed within the cavity 108 as shown in FIG. 15. In the illustrated embodiment the stem fixation device 134 take the form of a unistrut channel 136 coupled to at least one rod member 100. Preferably, the stem fixation device 134 includes at least two rod members 100, with one rod member 100 coupled to the backside of the unistrut channel 136 at each end thereof. The rod member 100 may be coupled to the unistrut channel 136 using any means known in the art including, but not limited to welding. Preferably at least one channel spring nut 138 is located with in the unistrut channel 136.

In use, a plate 140 is preferably provided to couple the end wall panel 50 to the stem panel 78. The plate 140 preferably includes a first portion 142 and a generally perpendicular second portion 144. Each of the first portion 142 and the second portion 144 of the plate 140 preferably includes a plurality of apertures 146 therethrough. The apertures 146 in the first portion 142 of the plate 140 are preferably aligned with the inserts 120 of the at least one fixation device 134. The apertures 146 in the second portion 144 of the plate 140 are preferably aligned with the apertures 146 in the channel spring nuts 138. It should be understood that the channel spring nuts 138 are slidable within the unistrut channels 136 to align each nut with an aperture 146 in the plate 140. A fastening member 148, such as a screw, is then inserted into each of the apertures 146 in the plate 140. The fastening members may then be tightened.

Figure 17:
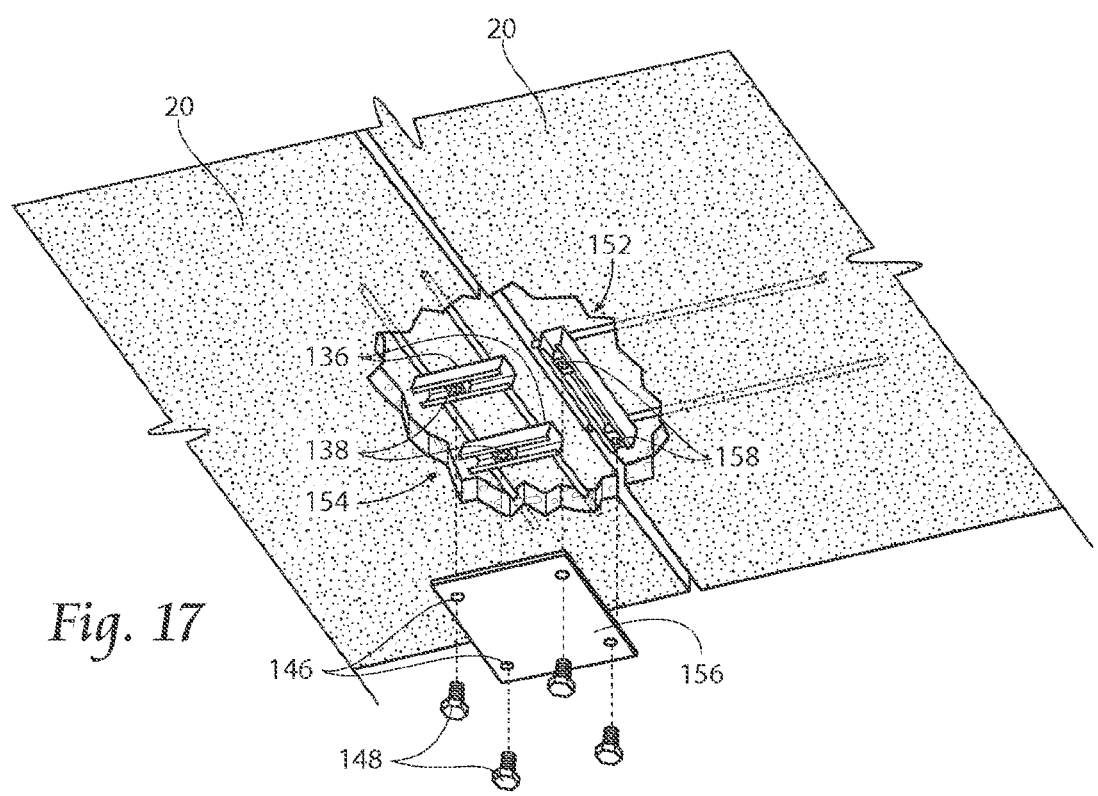
FIG. 17 is a close-up partially exploded perspective view of a joint between adjacent roof panels.

The adjacent roof panels 20 may then be fastened to each other. The adjacent roof panels 20 may be fastened using any means known in the art. In the illustrated embodiment each roof panel 20 may be secured to an adjacent roof panel 20 using a connection device 150 as shown in FIG. 17. The connection device 150 preferably includes a first portion 152 located in the first panel 20 and a second portion 154 located in the second panel 20. The portions 152,154 of the connection device 150 are preferably cast in their respective panels 20 during production.

Figure 18A:
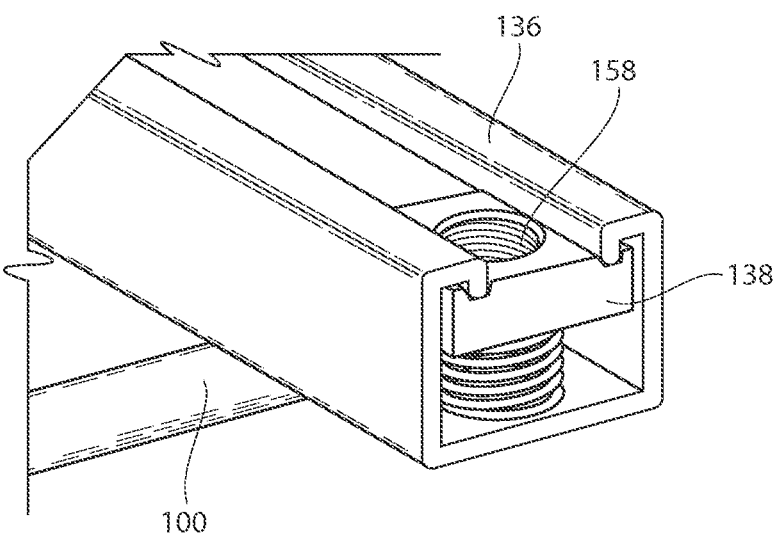
FIG. 18A is a perspective view of a portion of a roof panel connector according to the present invention.
Figure 18B:
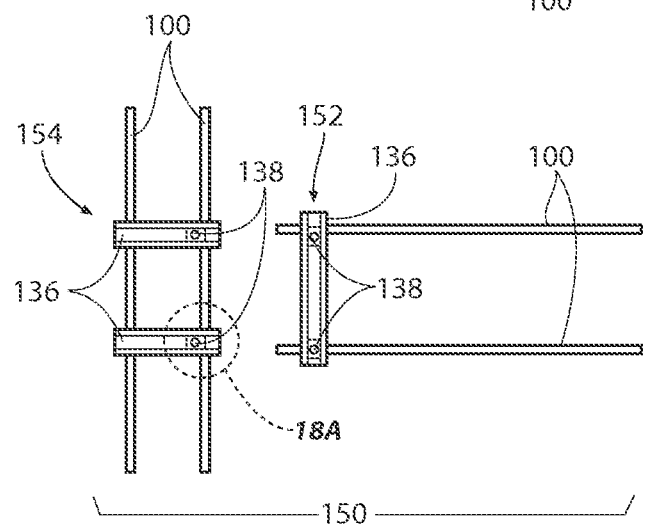
FIG. 18B is a perspective view of the connector of FIG. 18A embedded in a pair of adjacent roof panels.
Figure 18C:
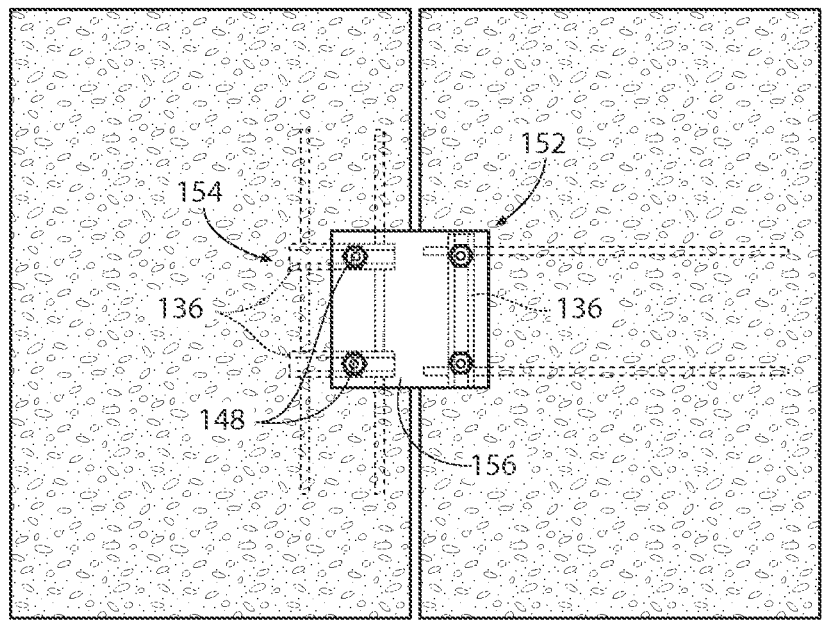
FIG. 18C is a perspective view of the connector of FIG. 18A embedded in a pair of adjacent roof panels with bolts installed.
Figure 19:
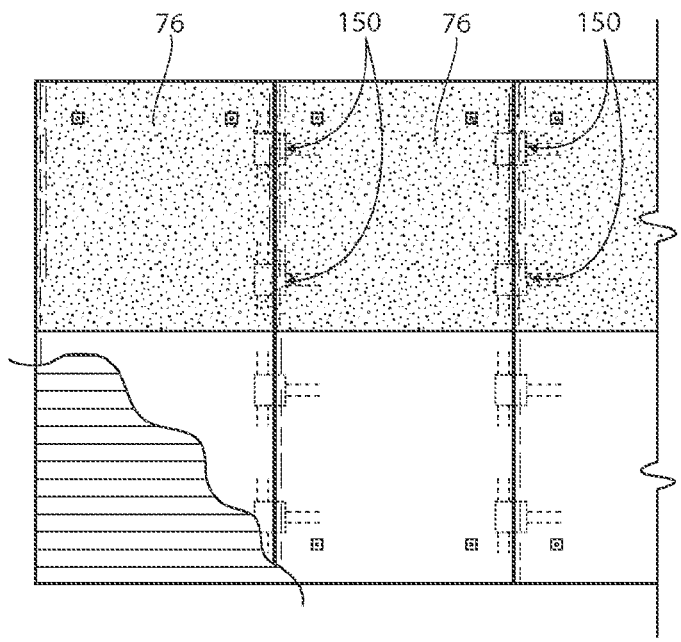
FIG. 19 is a top plan view of the building of FIG. 1.

As shown in FIG. 18B, the first portion 152 preferably comprises a first rod 100 and a second rod 100 coupled to a first unistrut channel 136. A pair of channel spring nuts 138 are preferably disposed within the first unistrut channel 136. The second portion 154 preferably comprises a third rod 100 and a fourth rod 100 coupled to a second unistrut channel 136 and a third unistrut channel 136. A channel spring nut 138 is preferably disposed in each of the second and third unistrut channels 136. The rods 108 may be coupled to the unistrut channel 136 using any means known in the art including, but not limited to welding.

In use, a plate 156 is placed over the plurality of unistrut channels 136. The plate 156 preferably includes a plurality of apertures 146 therethrough. The apertures 146 in the plate 156 are aligned with the apertures 158 in the channel spring nuts 138. It should be understood that the channel spring nuts 138 are slidable within the unistrut channels 136 to align each nut 138 with an aperture 146 in the plate 156. A fastening member 148, such as a screw, is then inserted into each of the apertures 146 in the plate 156. The fastening members 148 may then be tightened to secure the adjacent panels 20.

Each roof panel 20 is coupled to each adjacent roof panel 20 in at least one location on each roof member 62, in other words in two locations per roof panel 20. In the illustrated embodiment each roof panel 20 is coupled to each adjacent roof panel 20 in two locations per roof member 62, or four locations per roof panel 20.

Figure 16:
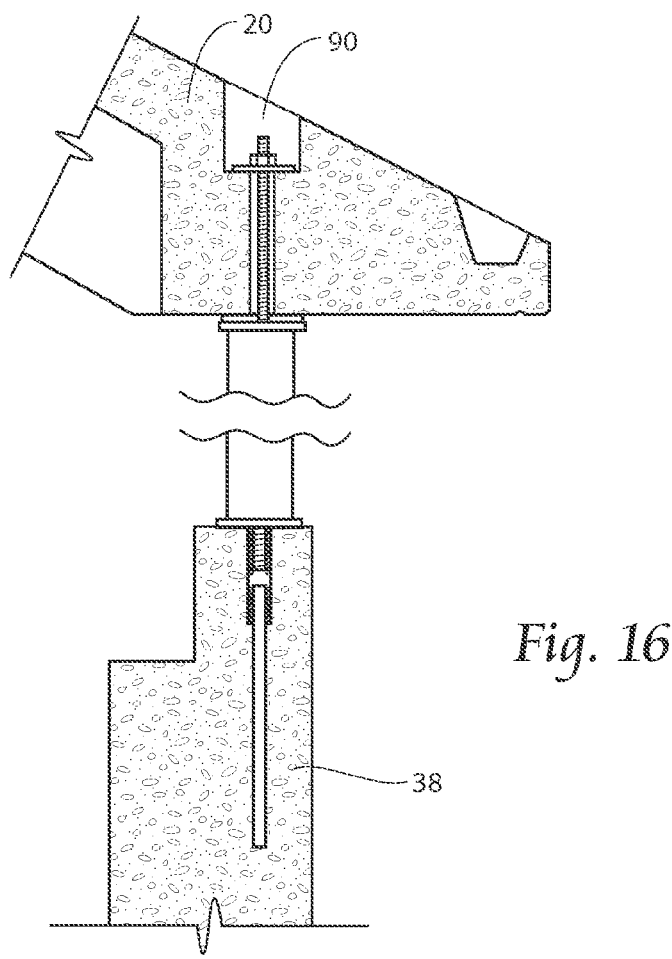
FIG. 16 is a cross sectional view of the joints between a roof panel and a column and a side beam and a column of a building according to the present invention.

The building may include columns 160 as shown in FIG. 16. In the illustrated embodiment each column 160 preferably includes a base plate 162 at the first end of the column 160 and a cap plate 164 at the second end of the column 160. A rod 128 is preferably coupled to the base plate 162, extending outward from the base plate 162. The rod 128 may be coupled to the base plate 162 using any means known in the art including, but not limited to, welding. A second rod 128 is preferably coupled to the cap plate 164, extending outward from the cap plate 164. The rod 128 may be coupled to the cap plate 164 using any means known in the art including, but not limited to, welding.

The columns 160 are preferably put in place prior to placing the roof panels 20. The columns 160 may be coupled to the side beams 38 using any means known in the art. In the illustrated embodiment the first rod 128 of the column 160 is preferably coupled to an insert 120 located in the top surface of the beam 38. The insert 120 is preferably cast in the beam 38 during production such that the first end of the insert 120 is generally flush with the top surface of the beam 38. If desired a second rod 118 may coupled to the second end of the insert 120 and embedded in the beam 38. Preferably, the first rod 128 is threaded into the insert 120 until the base plate 162 is flush with the top surface of the beam 38.

The roof panels 20 may be coupled to the columns 160 using any means known in the art. In the illustrated embodiment the roof panel 20 includes an aperture 98 extending therethrough. The aperture 98 is preferably sized and configured to allow the second rod 128 of wall panel securing member 112 to extend therethrough. When the roof panel 20 is set in place the bore is aligned with the second rod 128. If desired, after the roof panel 20 is set in place the aperture 98 may be filled with an adhesive substance, such as a non-shrink grout. If desired a locking member 94, such a nut may be secured to the free end of the second rod 128. The roof panel 20 preferably includes a cavity 90 formed in the outer surface 54 thereof as shown in FIG. 16. The cavity 90 is preferably sized and configured to allow a locking member 94, such as a nut to be attached to the free end of the second rod member 128.

Figure 4:
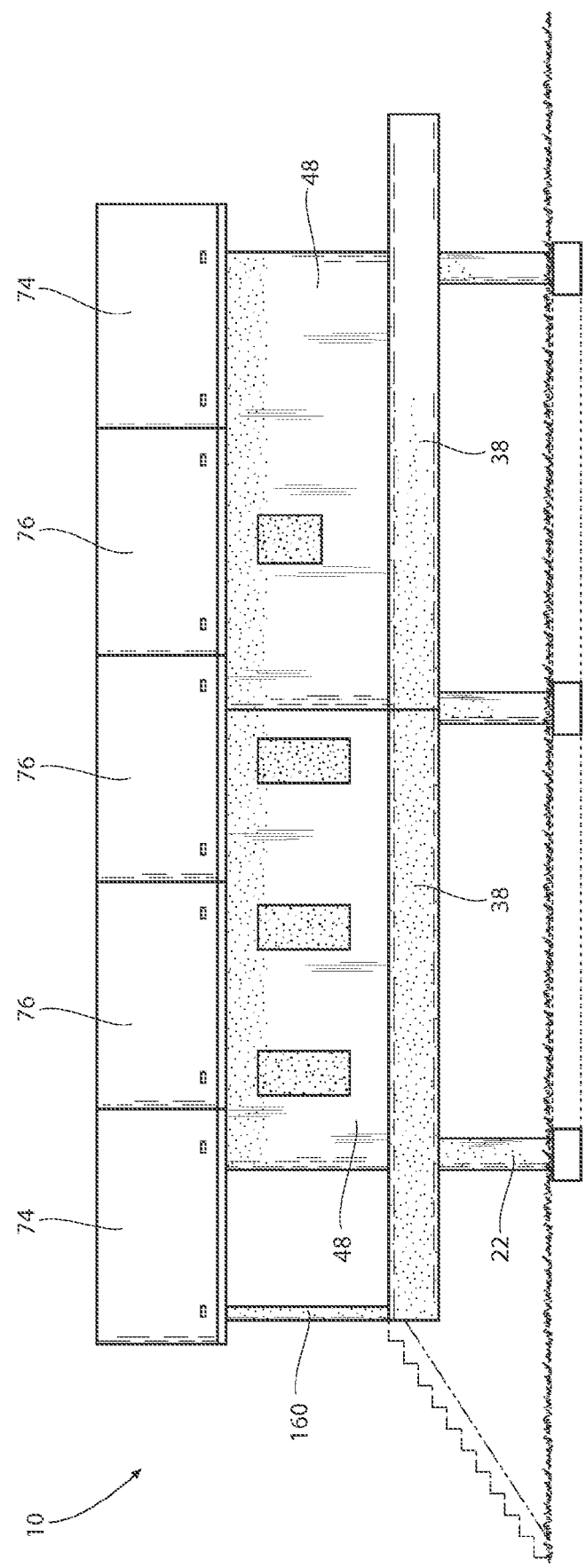
FIG. 4 is a side plan view of the building of FIG. 2.
Figure 5:
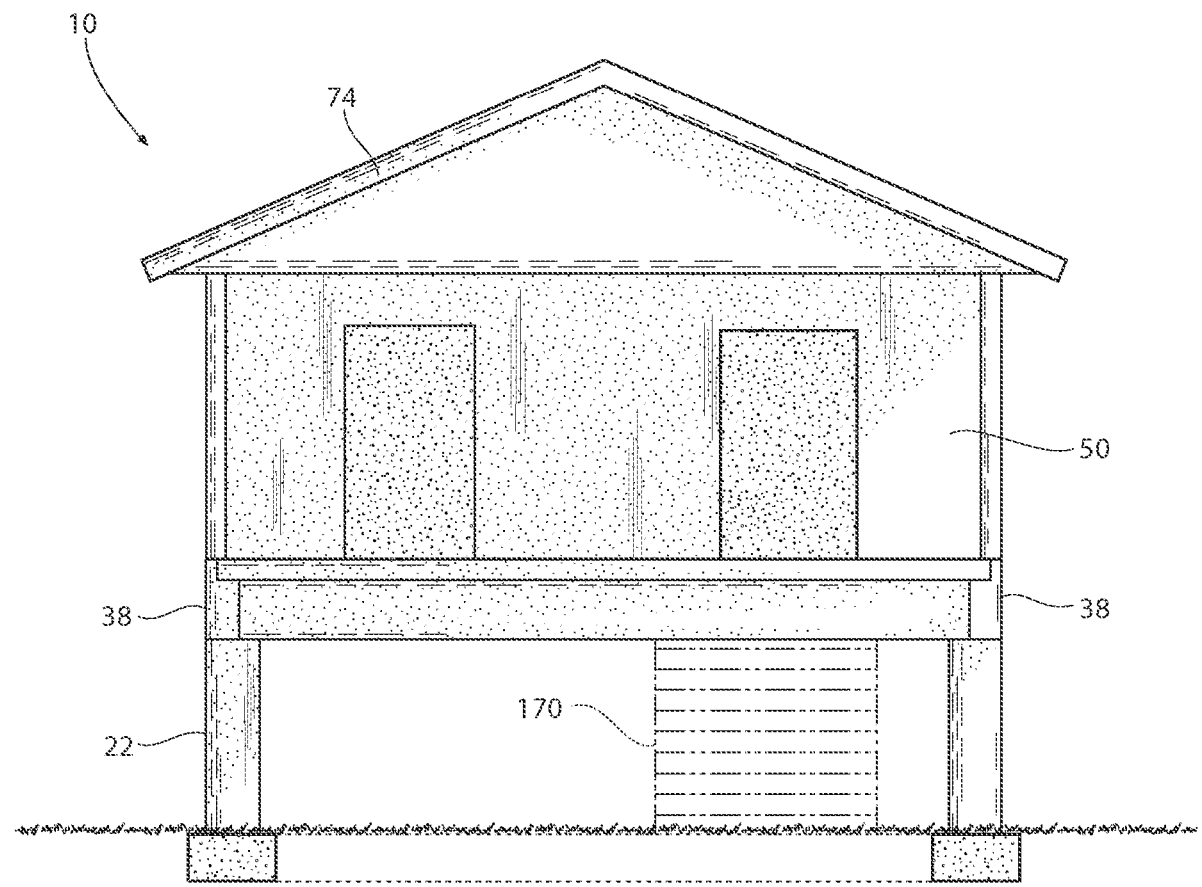
FIG. 5 is a rear plan view of the building of FIG. 2.

It is contemplated that the use of columns 160 may be desirable in embodiments of buildings 10 which include at least one porch 166 which is covered by a roof panel 20. In use, one column 160 will be used at each side of a porch 166. Preferably the columns 160 are located at the free end of the roof panel 20 as shown in FIG. 4. If a single covered porch 166 is included, two columns 160, one at either side of the porch 166 will be utilized. If two covered porches 166 are utilized, four columns 160 will be used, two columns 160 for the front porch 166 and two columns 160 for the back porch 166. It is further contemplated that the building 10 may include a partially covered porch 166 as shown in FIG. 4 which may not require a column 166 to support the weight of the cantilevered roof 20.

It is contemplated that any of the panels 16,18,20 may include embedded insulation 168 if desired. It is further contemplated any of the panels 16,18,20 may include embedded insulation 168 in a portion thereof, and no insulation 168 in another portion thereof. If desired, the thickness of the embedded insulation 168 may be reduced, or insulation 168 may be eliminated, at locations where connection members are embedded in the panel 16,18,20 or where bores 130 are required to accept a connection member as shown in FIGS. 11A through 11C, 14, and 15.

As described in detail above, the building 10 is a modular building 10 made of a plurality of support members 14, floor panels 16, wall panels 18, and roof panels 20. Although an illustrated embodiment is shown, the size, particular configuration, and number of panels 16,18,20 may be varied to form a building 10 with various different configurations. For example, the illustrated embodiment 10 of FIG. 1 through 5 shows a front porch 166 and a back porch 166. It is contemplated that a building 10 could include only a front porch 166, only a back porch 166, or no porch 166 at all. For example, the embodiment 220 shown in FIG. 21 includes no porches. For further example, the illustrated embodiment includes two side wall panels 52 on each side of the building 10. It is contemplated that more or fewer side wall panels 52 could be utilized in constructing a modular building 10. It is further contemplated that the building 10 could have a front staircase 170 and/or a back staircase 170.

It should be understood that each of the wall panels 18 may include any number and combination of apertures to create the desired house configuration. For example, any of the wall panels 18 may include windows 186 and/or doors 188. The windows 186 and/or doors 188 may be of any size desired and may be placed in any location desired.

It is further contemplated any of the interior or exterior surfaces of any of the panels 16,18,20 may be formed with a surface texture that simulates traditional building materials including, but not limited to shingles, siding, brick, stone, plaster and/or stucco. It is further contemplated that traditional building materials such as shingles, siding, brick, stone, plaster, stucco, and/or drywall may be applied to any of the surfaces of the building 10.

It is further contemplated that a weather and/or water resistant or weather and/or water proof substance may be applied to any of the panels 14,16,18,20. Such a substance may be applied to the panels 14,16,18,20 using any means known in the art including, but not limited to, spraying the substance on the panels 14,16,18,20 and brushing the substance on the panels 14,16,18,20.

Figure 20:
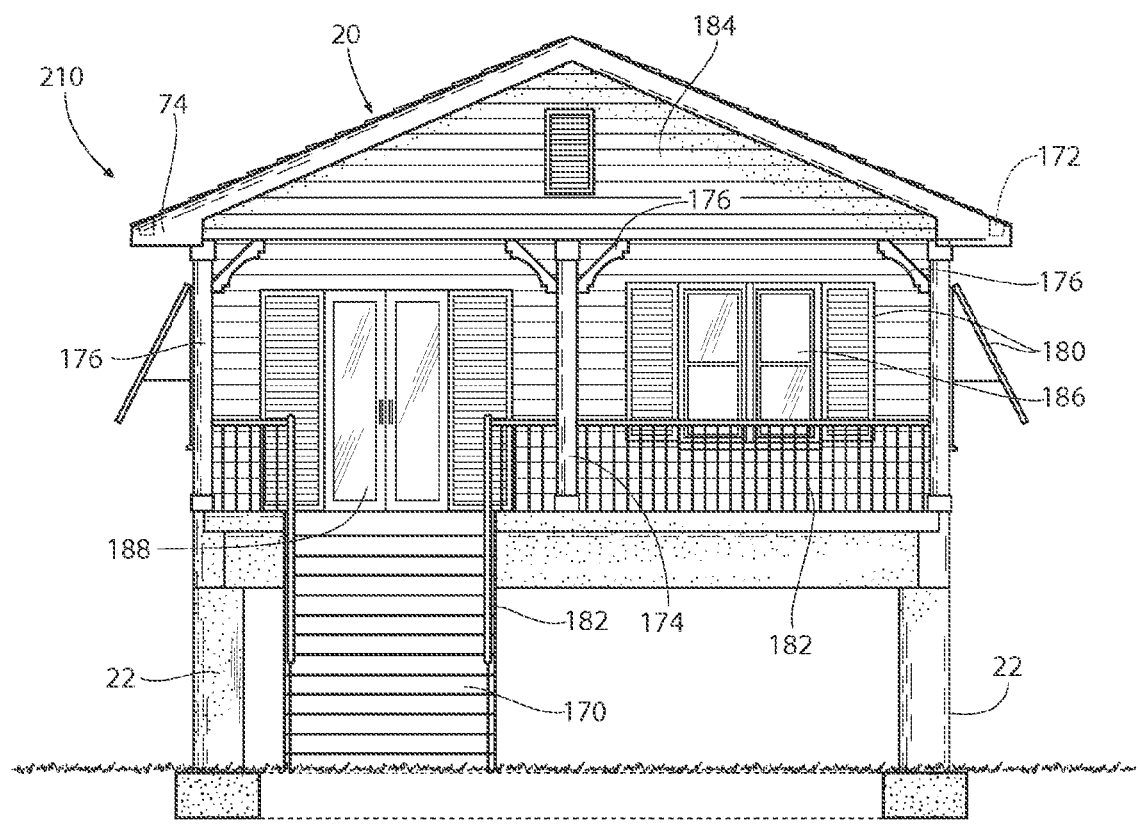
FIG. 20 is front plan view of an alternative embodiment of a building according to the present invention.

It is further contemplated that if desired, the building may include gutters 172. The gutters 172 may be of a traditional type that is attached to the building 10 using any means known in the art. It is further contemplated that the gutters 172 may be integrally formed in outer surface 64 of the roof panels 20 as shown in FIGS. 14 and 20. Such an arrangement would expedite the amount of time required to assemble the building 10.

It is further contemplated that, as shown in FIG. 20, a building 210 may include any type of architectural features in the art as shown in the embodiments of These architecture features may be functional or merely ornamental and may include, but are not limited to columns 174, various facades 176 to cover metal support columns, corner pieces 178, shutters 180, railings 182, and staircases 170.

It is further contemplated that, if desired, conduit (not shown) may be cast within the wall panels 18 for various wires, for example, and not by way of limitation, wires for electrical or telephone service. It is further contemplated that cavities for electrical boxes or fixtures may be cast in the wall panels 18 during production.

It is further contemplated that an end roof panel 74 may include two stem panels 78, rather than one stem panel 78 and one rib 80. Such an embodiment of an end roof panel 74 may be utilized in a building 10 similar to FIG. 2 which includes a facade on the outer end of a porch 166. It is contemplated that a decorative facade 184 on a stem member 78 of a roof panel 74 may be utilized.

Figure 22:
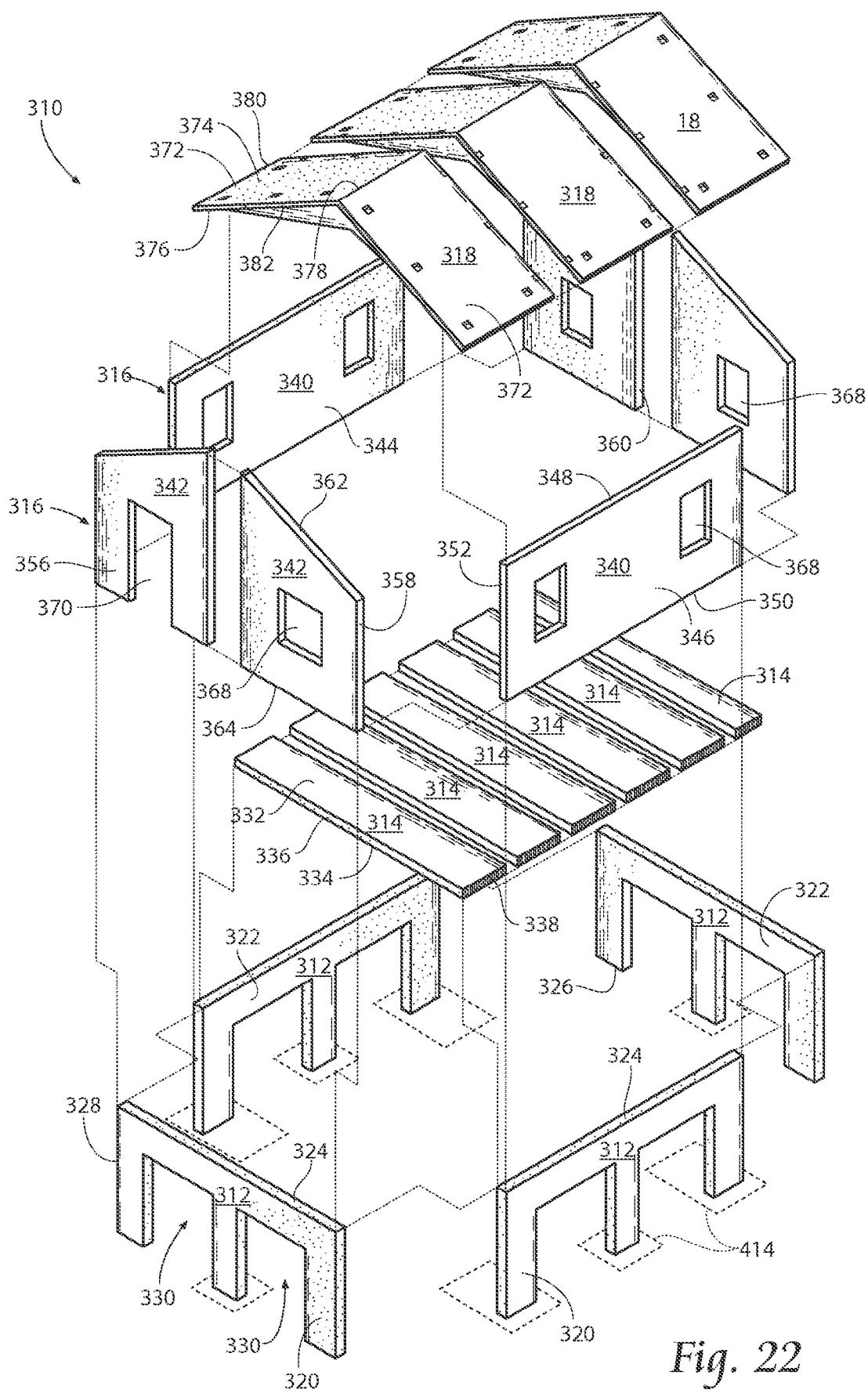
FIG. 22 is an exploded perspective view of an additional alternative embodiment of a modular building according to the present invention.
Figure 23:
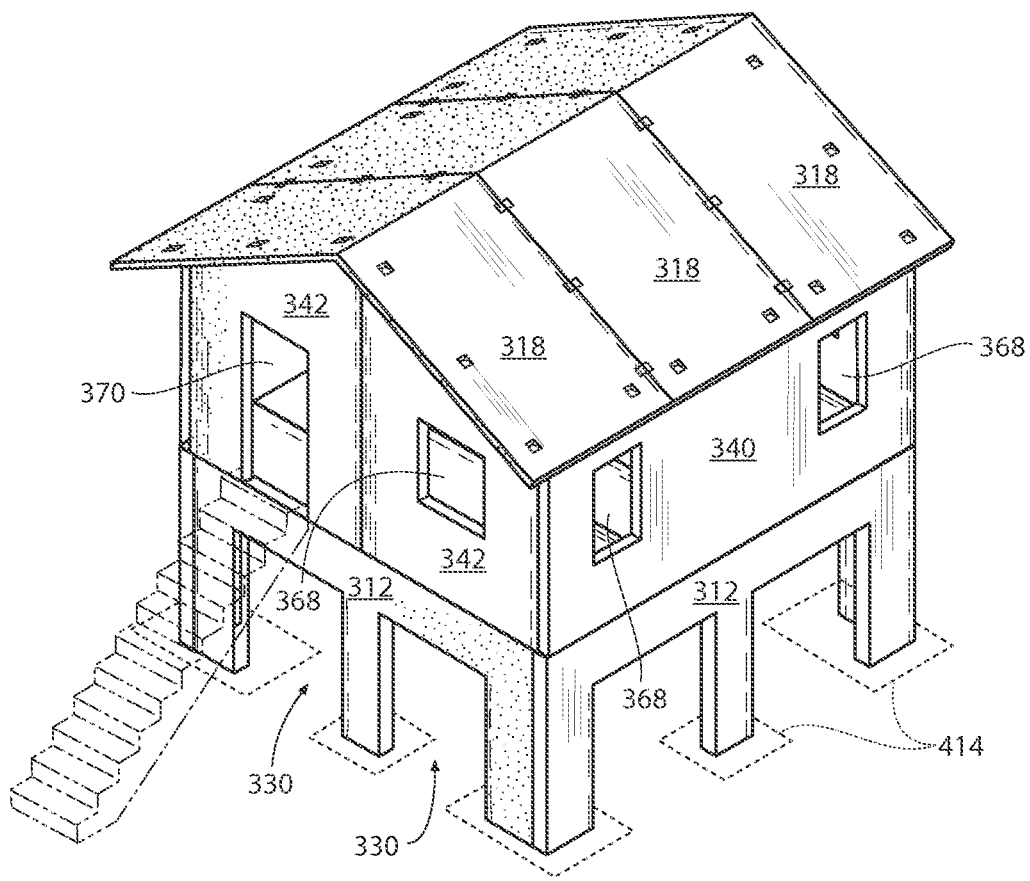
FIG. 23 is a perspective view of the building of FIG. 22 including a foundation and staircase in phantom.

FIGS. 22 and 23 show an alternative embodiment of a modular concrete building 310 according to the present invention. The building 310 preferably includes a plurality of lower frame panels 312, a plurality of floor panels 314, a plurality of wall panels 316, and a plurality of roof panels 318.

Figure 31:
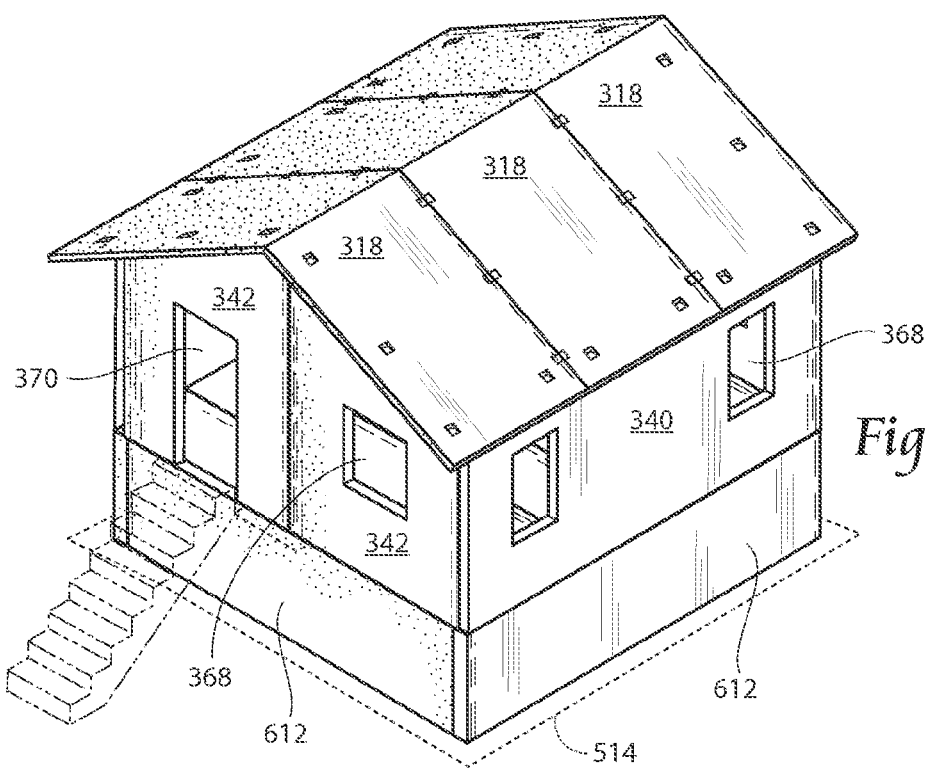
FIG. 31 is a perspective view of the modular building of FIG. 30 including an alternative foundation and staircase in phantom.

Preferably, each of the plurality of lower frame panels 312 is a precast concrete panel. The lower frame panel 312 has a generally rectangular configuration having an outer surface 320, an inner surface 322, a top surface 324, a bottom surface 326, and a pair of side surfaces 328; however one or more openings 330 may be formed in a lower frame panel 312. For example, the lower frame panels 312 may include a plurality of generally rectangular openings 330 as shown in FIGS. 22 and 326. Alternatively, the lower frame panels 312 may be solid as shown in FIG. 31. Various lower frame panel 312 configurations may be utilized to create various building designs as shown in FIGS. 22, 30 and 31. It is contemplated that is may be desirable to form the exterior portion of the lower frame panels 312 may be formed with a texture or pattern.

Preferably, each of the plurality of floor panels 314 is a precast concrete panel. Each of the plurality of floor panels 314 may be a pre-stressed concrete panel. Each of the floor panels 314 preferably has a generally rectangular configuration. Each of the floor panels 314 preferably has a too surface 332, a bottom surface 334, a pair of side surfaces 336, and a pair of end surfaces 338. Although the illustrated embodiment shows a precast concrete panel, the floor may be of any type known in the art including, but not limited to poured concrete slab with or without post-tension or steel pan with concrete infill.

Preferably, each of the plurality of wall panels 316 is a precast concrete panel. The plurality of wall panels 316 preferably includes at least two side wall panels 340 and at least two end wall panels 342. The side wall panels 340 preferably have a generally rectangular configuration. Each side wall panel 340 includes an inner surface 344, an outer surface 346, a top surface 48, a bottom surface 350, and a pair of side surfaces 352. In the illustrated embodiment the end wall panels 342 have a generally trapezoidal configuration. Each end wall panel 342 includes an inner surface 354, an outer surface 356, a lateral surface 58, a medial surface 360, a top surface 362, and a bottom surface 364. Preferably, the medial surface 360 is longer than the lateral surface 358. The medial surface 360 and the lateral surface 358 are preferably generally perpendicular to the bottom surface 364. The top surface 362 preferably extends from the lateral surface 358 to the medial surface 360. Although the illustrated embodiment shows a pair of end wall panels 342 combined to form a single side of the building, it is contemplated that a single end panel 342 formed with a peak could be utilized. It is contemplated that is may be desirable to form the exterior portion of the wall panels 316 may be formed with a texture or pattern.

Preferably, each wall panel 316 may be formed with at least one securing member 366 cast into the concrete during production. The securing member 366 is preferably cast into the wall panel 316 just under the inner surface 344,354 of the wall panel 316 near the bottom surface 50,64 of the wall panel 316. The securing member 366 will be used to secure the wall panel 316 to an associated floor panel 314 as will be described in more detail below.

Each wall panel 316 may be formed with either at least one window opening 368 and/or at least one door opening 370. It is also contemplated that a wall panel 16 could include no openings. In this manner, several wall panels 316 may be combined to create a desired building design.

The wall panels 316 may take any form known in the art. For example, it is contemplated that each wall panel 316 could be a solid panel with the inside of the wall panel 316 furred out to include the necessary elements such as, but not limited to studs, insulation, plumbing, and/or electrical conduit. It is further contemplated that each wall panel 316 could be an insulated sandwiched panel including an outer layer of concrete, a middle layer of insulation and an inner layer of concrete. It is contemplated that conduit could be embedded in one of the concrete panels for electrical needs.

Figure 27:
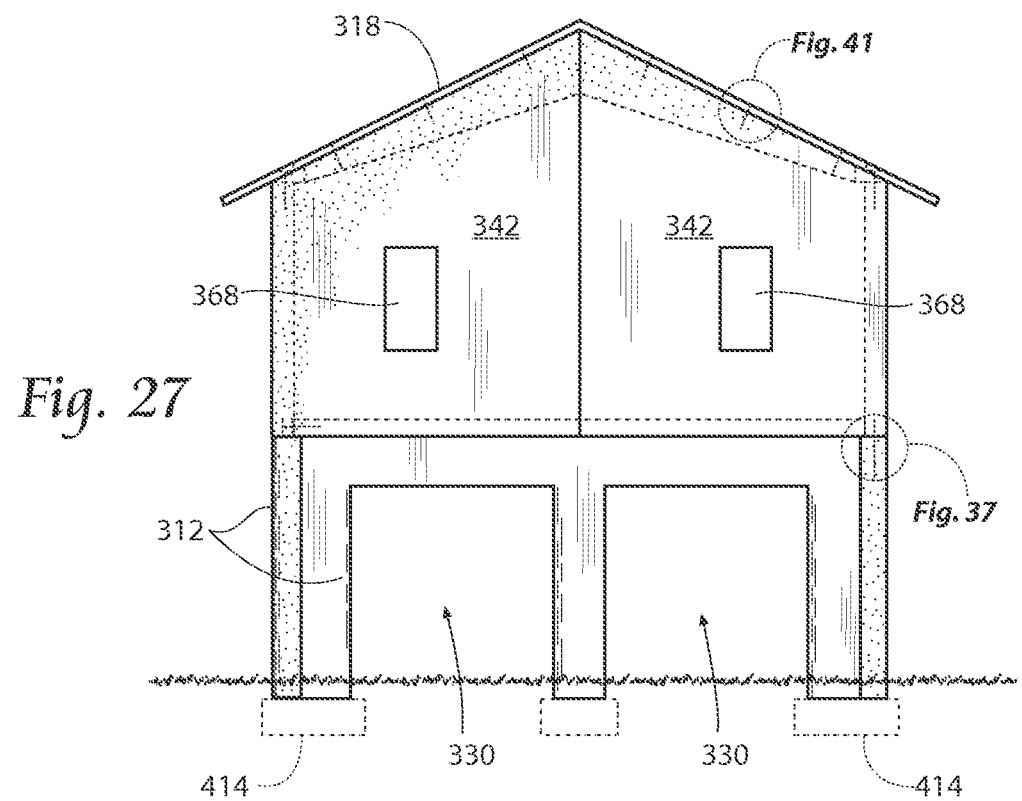
FIG. 27 is a rear plan view of the modular building of FIG. 22.
Figure 28:
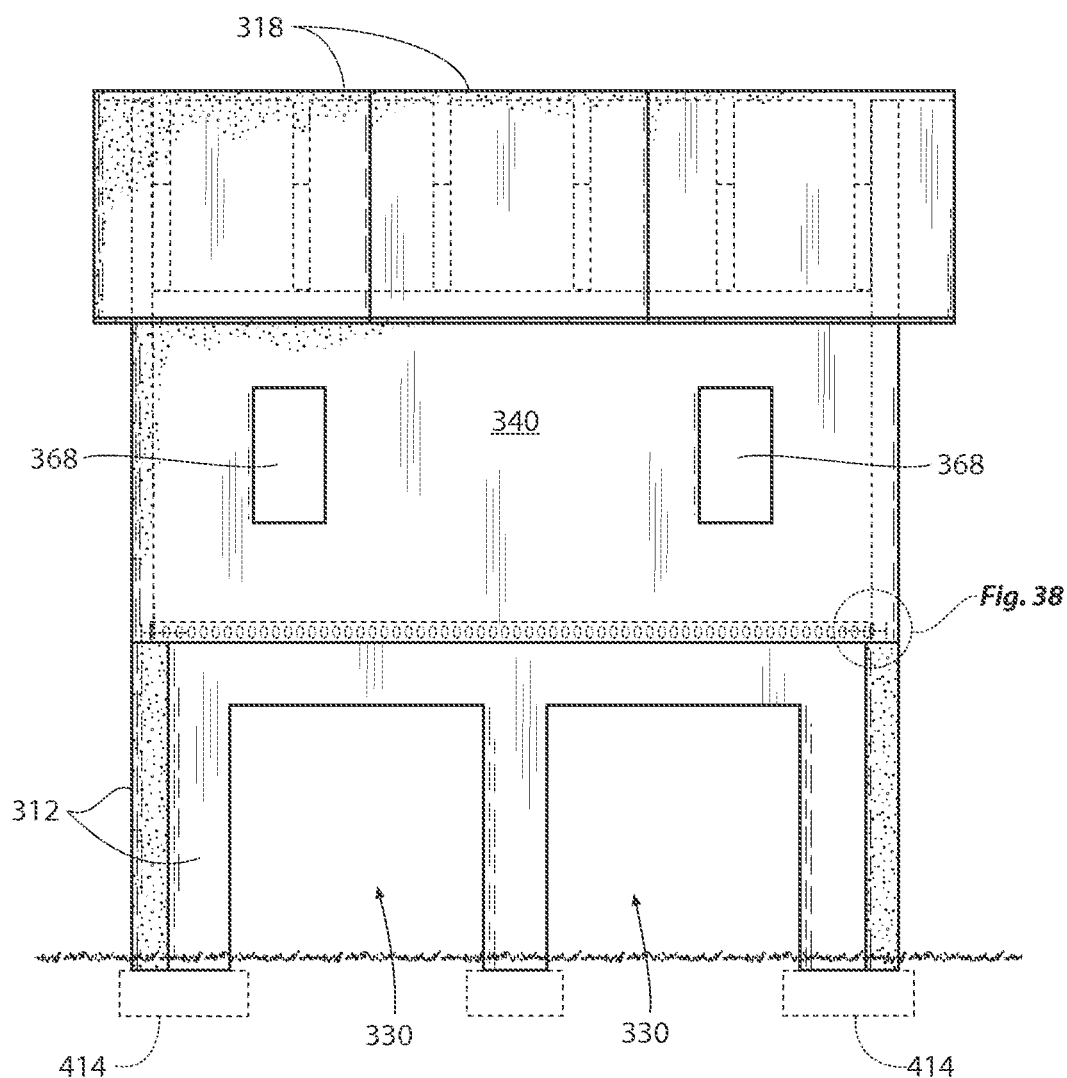
FIG. 28 is a side plan view of the modular building of FIG. 22.
Figure 33:
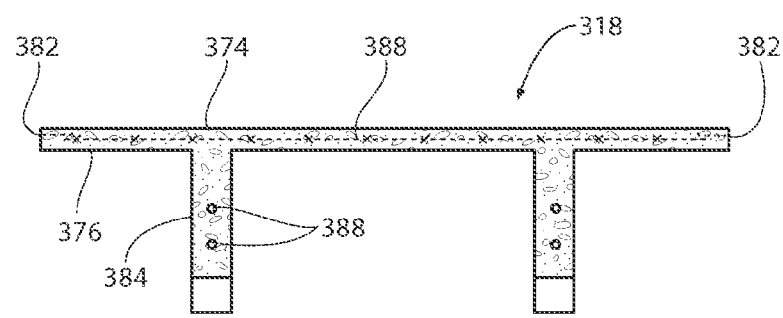
FIG. 33 is a sectional view taken along line 12-12 of FIG. 32.

Preferably, each of the plurality of roof panels 318 is a precast concrete panel. Preferably, the roof panels 318 are not pre-stressed concrete panels. Each roof panel 318 preferably includes a pair of generally planar roof members 372. Each roof member 3372 is generally rectangular and has an outer surface 374, an inner surface 376, a medial surface 378, a end surface 380, and a pair of opposed side surfaces 382. Preferably, a pair of roof members 372 may be integrally formed at their medial surfaces 378 to form a peak as shown in FIG. 33. The peak of the roof panel 318 is preferably sized and configured to mate with the top surfaces 362 of the end wall panels 342, as shown in FIG. 27. It is contemplated that is may be desirable to form the exterior portion of the roof panels 318 may be formed with a texture or pattern.

Each roof member 372 preferably includes a pair of ribs 385 as shown in FIG. 34. Each rib 384 extends along the inner surface 376 of the roof member 372 from the medial surface 378 to an attachment portion 86 formed near the end surface 380. Preferably, each roof member 372 includes at least one stiffening member 388. In the illustrated embodiment the stiffening member 388 takes the form of mesh as is known in the art. Each rib 384 preferably includes at least one stiffening member 388. In the illustrated embodiment each rib 384 includes two stiffening members 388. The stiffening members 388 may take the form of rebar or any other type known in the art.

Figure 41:
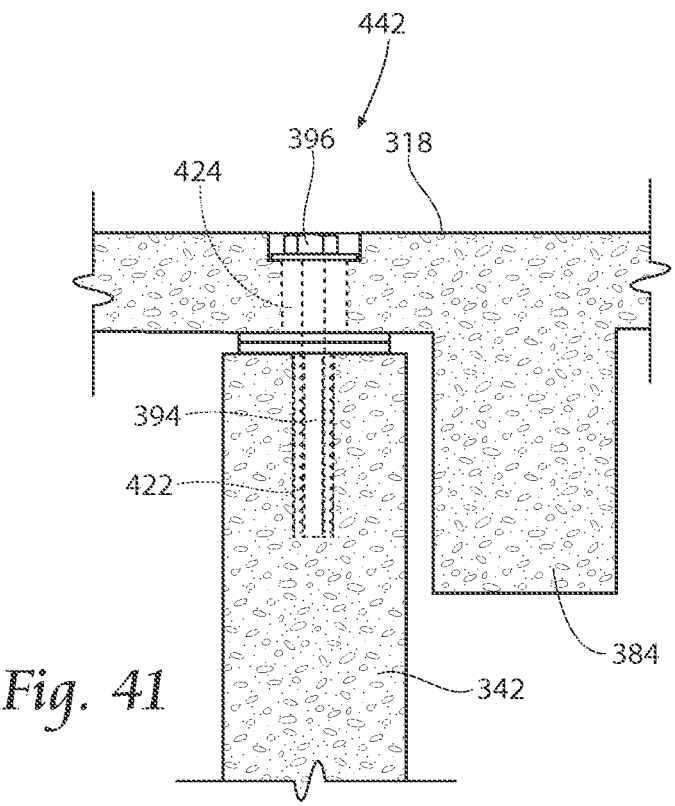
FIG. 41 is a close-up view of a joint between an end wall panel and a roof panel.

As seen in FIGS. 33 and 41, it is further contemplated that at least one attachment portion 86 may be formed on the inside surface 376 of each roof member 372. As shown in FIG. 33, the attachment portion 386 is preferably located near the end surface 380 of each roof member 372. The attachment portion 386 preferably includes a flattened portion 390 which is sized and configured to mate with the top surface 348,362 of a wall panel 340,342. As seen in FIG. 41, the attachment portion 386 may further include a cavity 392 formed in the outer surface 374 of the roof member 72. The cavity 392 is preferably sized and configured to accommodate a fixation member 394 such as a threaded rod and a locking member 396 such as a locking nut.

Figure 38:
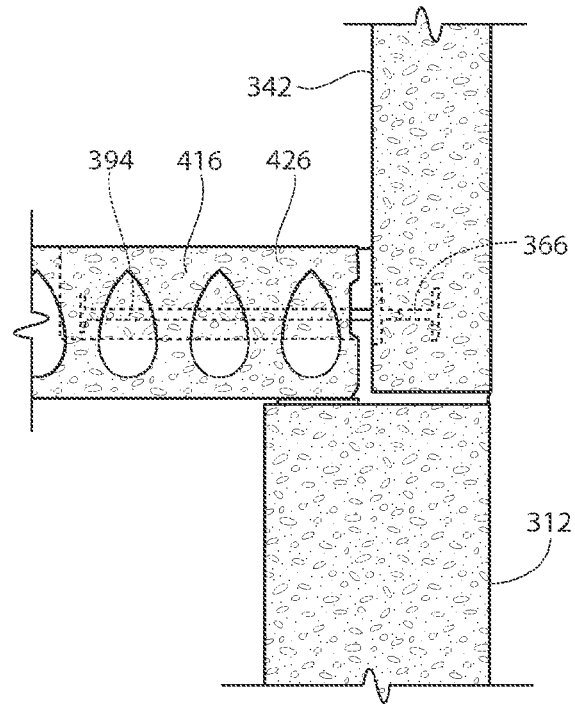
FIG. 38 is a close-up view of a joint between a wall panel, a floor panel, and a lower frame panel.
Figure 39:
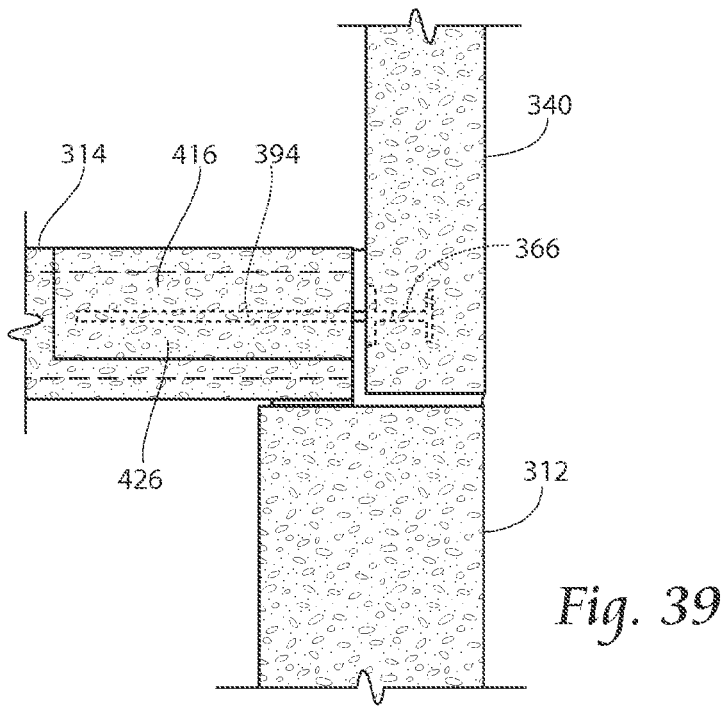
FIG. 39 is a close-up view of a joint between a wall panel, a floor panel, and a lower frame panel.

As shown in FIG. 23, preferable multiple roof panels 318 are used on a single building 310. FIGS. 38 and 39 show a method for coupling a first roof panel 318 to an adjacent second roof panel 318. Preferably, at least one rectangular cavity 398 is formed in the outer surface 374 of each adjacent roof panel at the side surface 382. A fastening device 400 is then placed in the cavity 398 and adjusted to couple the adjacent panels 318. In the illustrated embodiment the fastening device 400 takes the form of a generally rectangular fastening member 402 with a plurality of holes 404 formed therein. A securing member 406 is threaded into each hole 404. The securing member 406 preferably has a head 408, and may take the form of a bolt and preferably includes a locking member 410, such as a nut threaded thereon. The illustrated embodiment further includes a fastening plate 112 which preferably mirrors the shape of the cavity 398 and includes a pair of flanges.

The panels 318 are first placed in position. At least one cavity 398 is then formed on the outer surface 374 of each adjacent roof panel at the side surface 382. In the illustrated embodiment three cavities 398 are formed on each side 382 of each roof member 372. It should be understood that the cavities 398 are only formed on the sides 382 of the roof panels 318 that are adjacent the side surface 382 of another roof panel 316. As seen in FIG. 36, the first cavity 398 formed in the first panel 318 and the second cavity 398 formed in the second panel 318 form a larger fixation cavity. A fastening plate 412 may be placed in each cavity 398. The fastening device 400 is placed in the fixation cavity formed by the first and second cavities 398. The securing members 406 and locking member 410 are adjusted to firmly retain the fastening device 400 and fastening plate 412 within the cavities 398 and to secure the first panel 318 to the second panel 318. This may be achieved by rotating each securing members 406 until its head 408 engages the wall of the cavity 398. The locking member 410 is then rotated to lock the securing member 406 in place.

Figure 21:
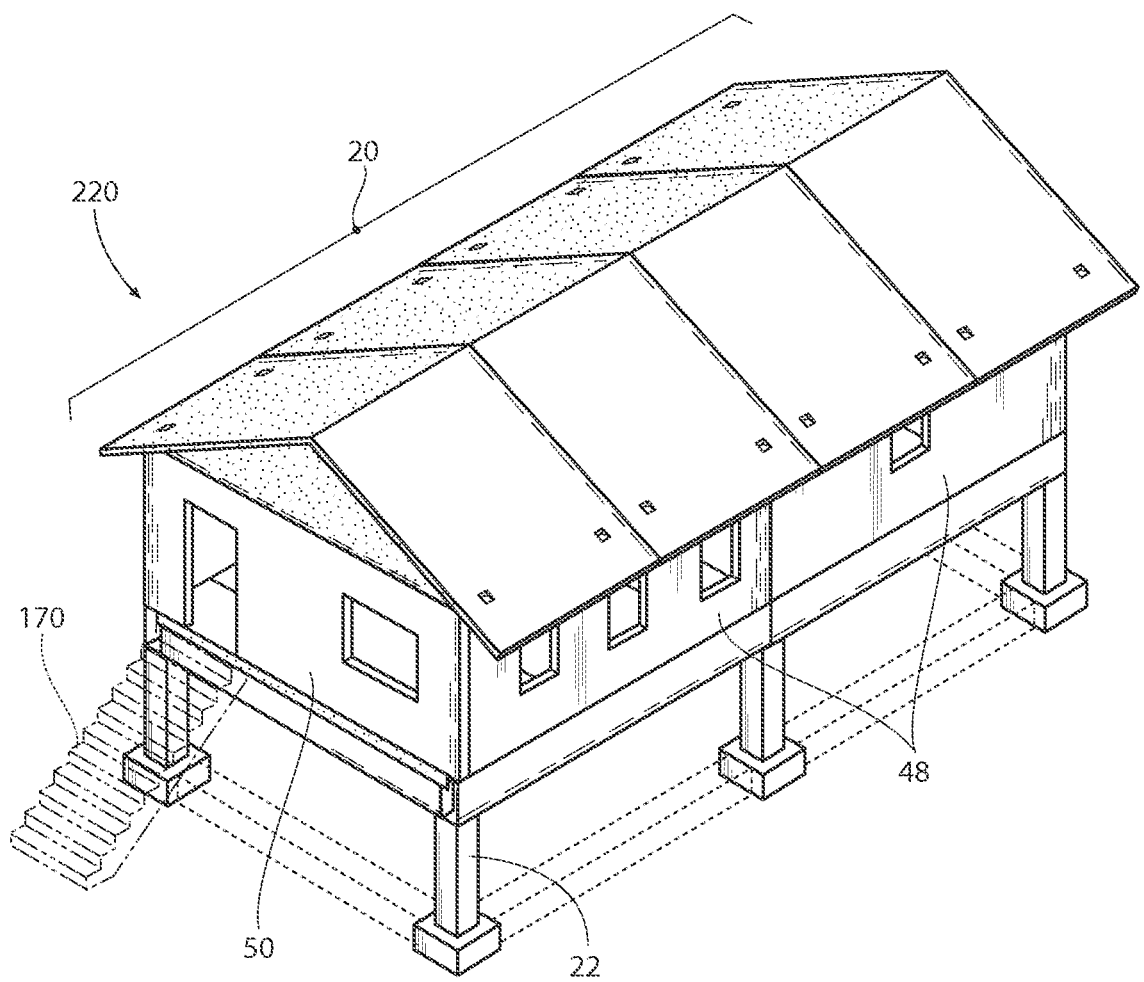
FIG. 21 is a perspective view of an additional alternative embodiment of a building according to the present invention.

FIG. 21 shows an alternative method for coupling adjacent roof panels 318. In the alternative method, the roof panels 318 are not formed with cavities 398 on the outer surface as described above. As shown in FIG. 21, a fastening device 500 comprising a fastening plate 502 may be placed at the intersection of a pair of adjacent roof panels 318 such that the first end 504 of the fastening plate 502 is on a first roof panel 318 and the second end 506 of the fastening plate 502 is on a second adjacent roof panel 318. The fastening plate 502 may include a plurality of holes 508 formed therethrough, preferable the fastening plate 502 includes two holes 508 in each end 504,506 of the fastening plate 502. A fixation member 510 such as a screw may be inserted through each of the holes 508 in the fastening plate 502 and into an associated roof panel member 318. In the illustrated embodiment, two fixation plates 502 are used on each side of each roof member 372. It should be understood that the fastening plates 502 are only attached near sides 382 of the roof panels 318 that are adjacent the side surface 382 of another roof panel 318.

Figure 24:
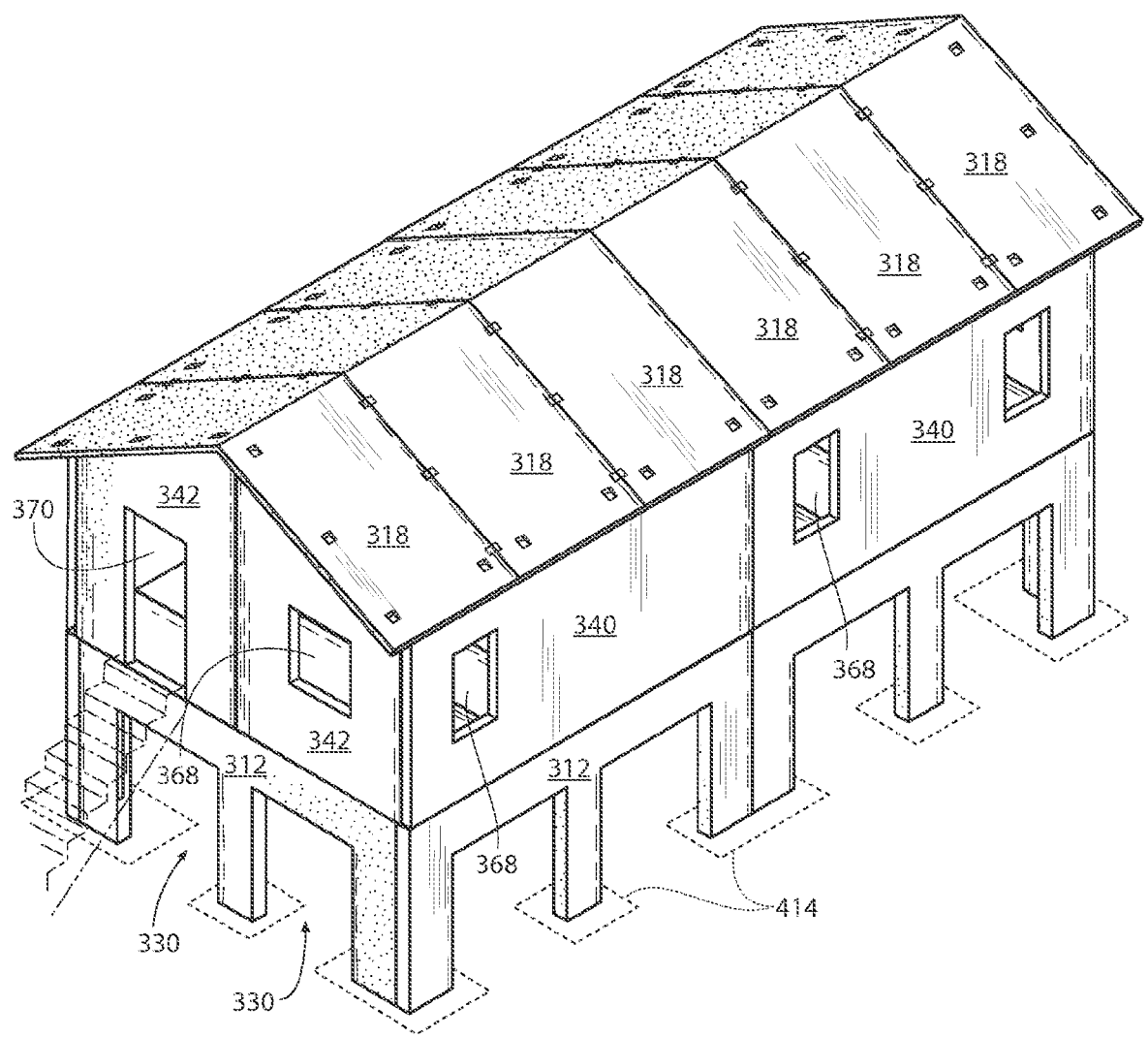
FIG. 24 is a perspective view of an alternative embodiment of a modular building according to the present invention including a foundation and staircase in phantom.
Figure 26:
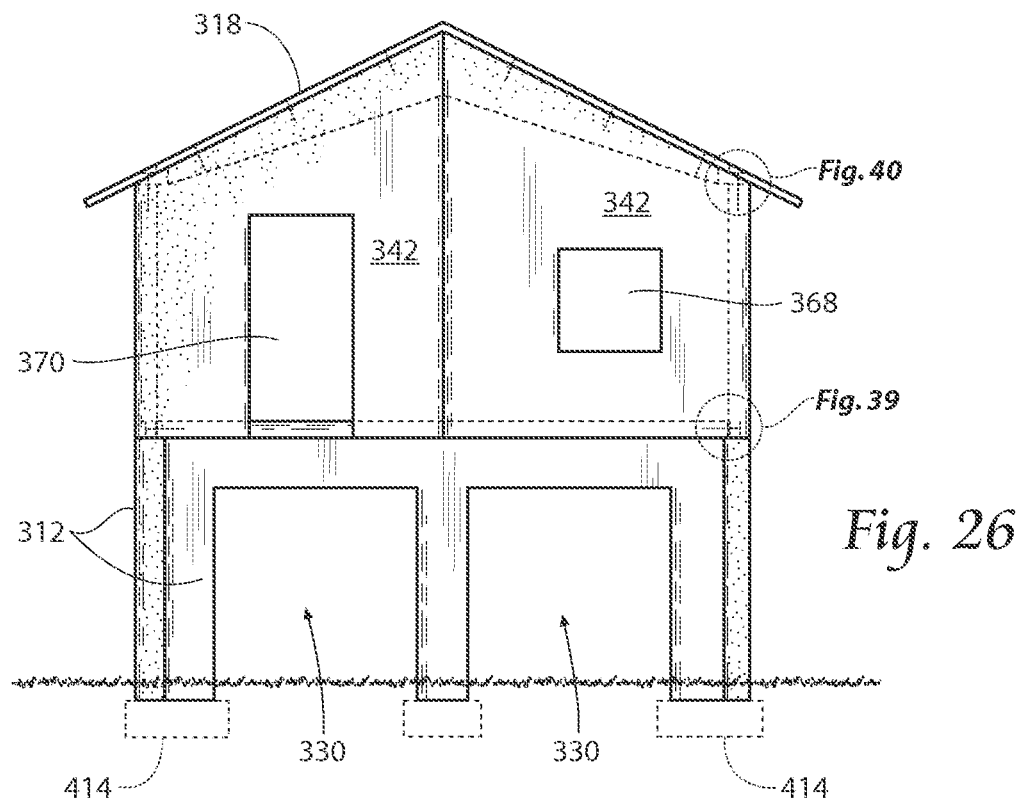
FIG. 26 is a front plan view of the modular building of FIG. 22.

As discussed above, lower frame 312 and wall panels 316 as described above may be put together in various numbers and various configurations to create building with a desired design. FIG. 23 shows an embodiment of a building including a single pair of sidewalls 340. FIG. 24 shows an embodiment of a building including two pair of sidewalls 340. FIG. 26 shows an embodiment of a building including at a pair of lower frame panels 312 and a pair of side wall panels 340 adapted to provide a covered porch. FIG. 30 shows an embodiment of a building including shortened lower frame panels 512. FIG. 31 shows an embodiment of a building including solid lower frame panels 612. It should be understood that the various configurations of wall panels 16 and lower frame panels 312,512,612 may be combined in additional manners to create a desired building design.

In the illustrated embodiment, the wall panels 316 preferably have a thickness of approximately six (6) inches. In the illustrated embodiment the lower frame panels 312 preferably have a thickness of approximately twelve (12) inches. In the illustrated embodiment the roof panels 318 preferably have a thickness of approximately three (3) inches. In the illustrated embodiment, each rib 384 preferably has a thickness of approximately six (6) inches. In the illustrated embodiment the floor panels 314 preferably have a thickness of approximately eight (8) inches.

Figure 32:
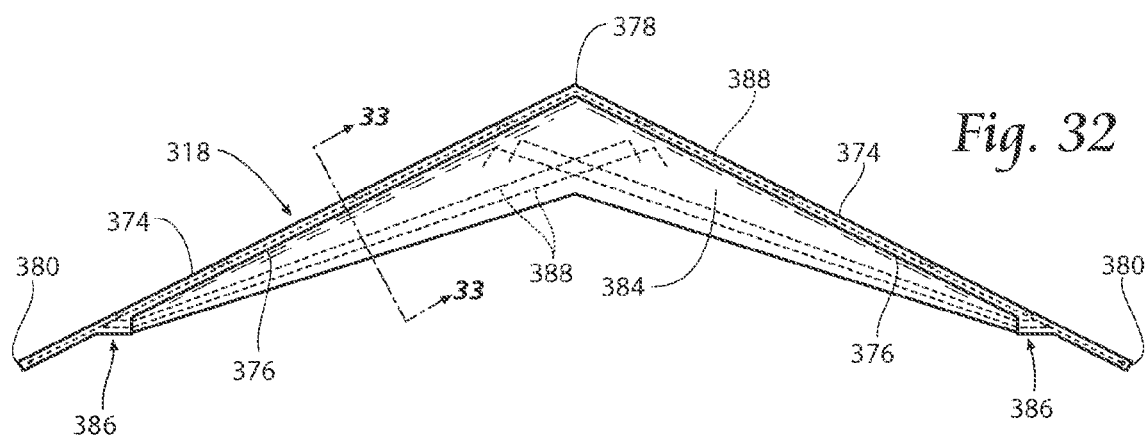
FIG. 32 is a side view of a roof panel according to the present invention.

To construct a building 310 using the above described lower frame 312, wall 316, and roof panels 318, a foundation 414 is first laid. The foundation 414 may take any form known in the art including, but not limited to be a full poured concrete slab extending under the entire building, as shown in FIG. 32, or a poured concrete footings as showed in FIG. 23. It is further contemplated that the foundation 414 may include piles driven into the ground as is known in the art. The foundation 414 may include a plurality of pins 446 adapted to engage the lower frame panels 312.

The lower frame panels 312 may then be set on top of the foundation 414. Prior to setting each lower frame panel 312 on the foundation 414 at least one hole 448 may be drilled in the top surface of the foundation 414. Each hole 448 is preferably adapted to engage a pin 446 cast in the bottom surface 326 of the lower frame panel 312 during production. The lower frame panels 312 may then be set in place such that holes 448 formed in the foundation 414 are aligned with pins 446 cast in the lower frame panel 312 during production. It is further contemplated that rather than drilling a hole in the top surface of the foundation 414, a sleeve may be cast in the top surface of the foundation during production. It is further contemplated that the lower frame portion of the building could take alternate forms including but not limited to cast in place concrete or masonry.

The plurality of floor panels 314 may then be set on top of the lower frame panels 312. Prior to setting the floor panels 314 on the lower frame panels 312, at least one generally rectangular cavity 416 is formed on the top surface 332 of the floor panel 314 at each end of the floor panel 314. It is further contemplated that in some circumstances it may be desirable to pour a leveling topping over the floor panels 314.

Figure 40:
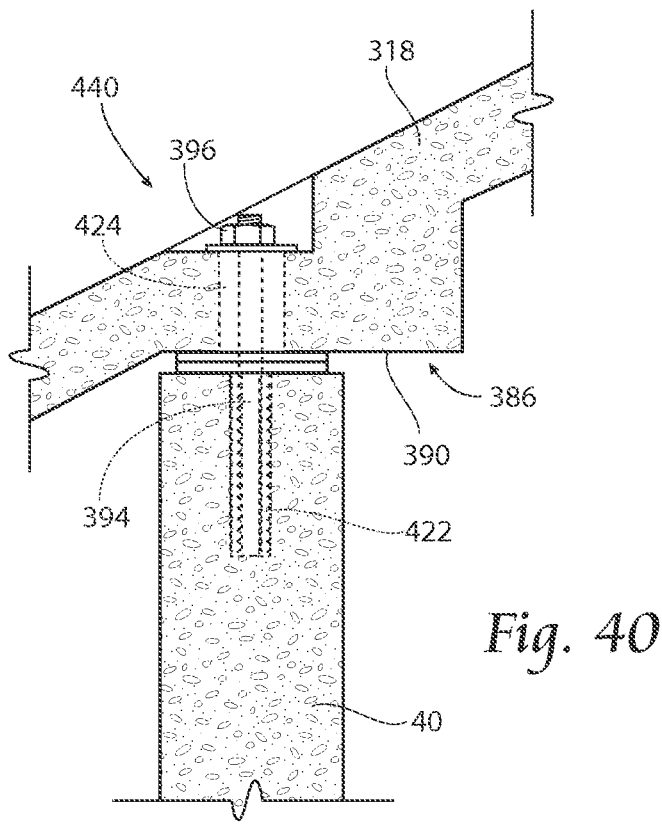
FIG. 40 is a close-up view of a joint between a side wall panel and a roof panel.

The plurality of wall panels 316 may then be set on top of the lower frame panels 312. Each of the plurality of wall panels 316 maybe secured to the associated lower frame panel 312 as shown in FIG. 38 and to the associated floor member as shown in FIGS. 39 and 40.

Prior to setting the wall panels 316 on the lower frame panels 312 a plurality of first bores 418 are drilled in the lower surface 350,364 of the wall panels 316 and a plurality of second bores 420 are drilled on the top surface 324 of the lower frame panels 312. A fixation member 394 is preferably secured in each of the first bores 418. The fixation member 394, such as a threaded rod, may be secured in the first bore 418 by placing an insect 422 in the first bore 418 and threading the fixation member 394 into the first bore 418. The insert 422 may take any form known in the art including, but not limited to, a coil insert. The insert 422 preferably includes a threaded interior surface. An additional fixation member 394 may be threaded into each of the securing members 366 preformed in the wall panels 316. These fixation members 394 are preferably adapted to be seated within one of the cavities 416 formed in the floor members 314.

It is further contemplated that a sleeve 424 may be placed in each of the second bores 420. Prior to placing the wall panel 316 on the lower frame panel 3412, each sleeve 424 mi ay be filled with a fixation material 426, such as a non-shrinking grout. The plurality of wall panels 316 may then be set on top of the lower frame panels 312. The plurality of cavities 416 formed in floor members 314 may then be filled with a fixation material 426 such as non-shrinking grout. Preferably, each wall panel 316 is secured to the associated lower frame panel 312 in at least two locations. In the illustrated embodiment each side wall panel 340 is secured to the associated lower frame panel 312 in three locations. Preferably, each wall panel 342 is secured to the associated floor panel 314 in at least two locations.

Figure 37:
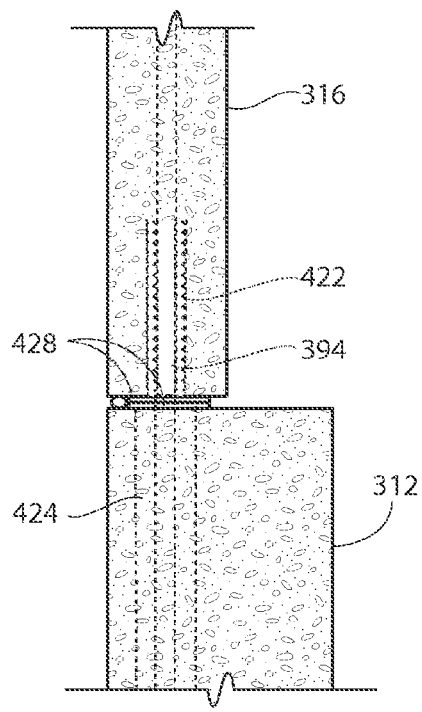
FIG. 37 is a close-up view of a joint between a wall panel and a lower frame panel.
Figure 42:
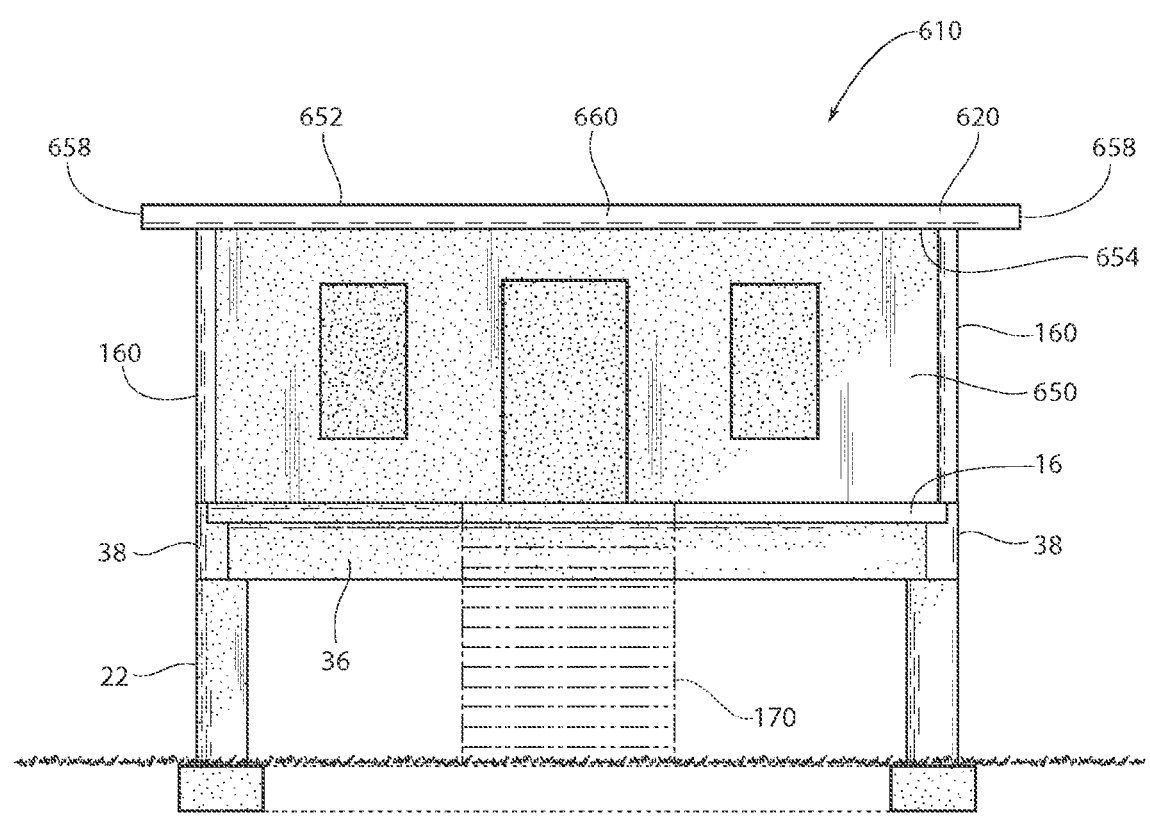
FIG. 42 is a front plan view of an alternative embodiment of a modular building according to the present invention.

The plurality of roof panels 318 may then be placed on top of the plurality of wall panels 316. As seen in FIGS. 41 and 42, preferably at least one bearing pad 428 is placed between the roof panel 318 and the wall panels 340,342. The roof panels 318 are then coupled to the plurality of wall panels 316. The roof panels 318 may be coupled to the side wall panels 340 as shown in FIG. 41 and described below and to the end wall panels 342 as shown in FIG. 42 and described below. Adjacent roof panels 318 may be coupled to each other as shown in FIGS. 36 and 37 described above.

As shown in FIG. 41, preferably the roof panel 318 is formed with a flattened attachment portion 386. At least one hole is formed in each roof panel 318 attachment portion 386 and into the top surface 348 of the side wall 340 panel forming an aperture 430 through the roof panel 318 and a bore 432 in the top surface 348 of the side wall panel 340. A fixation member 394 is preferably secured in each of the bores 432. The fixation member 394, such as a threaded rod, may be secured in the bore 432 by placing an insert 422 in the bore 432 and threading the fixation member 394 into the bore 432. A sleeve 424 may be placed in the roof panel 318 aperture 430. The sleeve 424 may then be filled with a non-shrinking grout 426. The roof panel 318 may then be placed in position such that the fixation member 494 extends through the aperture 430 in the roof panel 318. The fixation member 394 may then be secured from the top of the roof panel. In the illustrated embodiment the fixation member 394 is secured by placing a washer over the end of the fixation member and tightening a locking member 396, such as a nut onto end of the fixation member 394.

Preferably, each end of the roof panel 318 is secured to an associated side wall panel 340 in at least two locations. In the illustrated embodiment, as shown in FIG. 35, each end of the roof panel 318 is secured to an associated side wall panel 340 in three locations. However, it is contemplated that each end of the roof panel 318 coupled be secured to an associated side wall panel 340 more than three locations.

As shown in FIG. 42, the roof panel 318 is coupled to the end wall panel 342 in a similar manner to that described above. A hole is formed in the roof panel 318 and into the top surface 362 of the end wall panel 342 forming an aperture 430 through the roof panel 318 and a bore 432 in the top surface 362 of the end wall panel 342. A fixation member 394 is preferably secured in each of the bores 432. The fixation member 394, such as a threaded rod, may be secured in the bore 432 by placing an insert 422 in the bore 432 and threading the fixation member 394 into the bore 432. A sleeve 424 may be placed in the roof panel 318 aperture 432. The sleeve 422 may then be filled with a fixation material 426, such as non-shrinking grout. The fixation member 394 may then be secured from the top of the roof panel 319. In the illustrated embodiment the fixation member 394 is secured by placing a washer over the end of the fixation member 394 and tightening a locking member 396, such as a nut onto end of the fixation member 394.

As shown in FIG. 35, preferably, each end of the roof panel 318 is secured to an associated end wall panel 342 in at least two locations. However, it is contemplated that each end of the roof panel 318 could be secured to an associated end wall panel 342 more than two locations.

It should be understood that in an embodiment as shown in FIG. 26, utilizing a cantilevered porch, additional elements, such as columns 436 and roof support beams 438 will be utilized. It should further be understood that various elements, such as stairs, may be added to the building.

It is further contemplated that is may be desirable to seal the joints between the various panels 412,414,416,418 that comprise the building 10. The joints may be sealed with caulk as is known in the art.

In the illustrated embodiments described above the fixation members 494 take the form of a threaded rod; however it is contemplated that any fixation member 494 known in the art may be utilized. In the illustrated embodiments above, the locking members 396,410 take the form of nut; however it is contemplated that any locking member 396,410 known in the art may be utilized.

Figure 43:
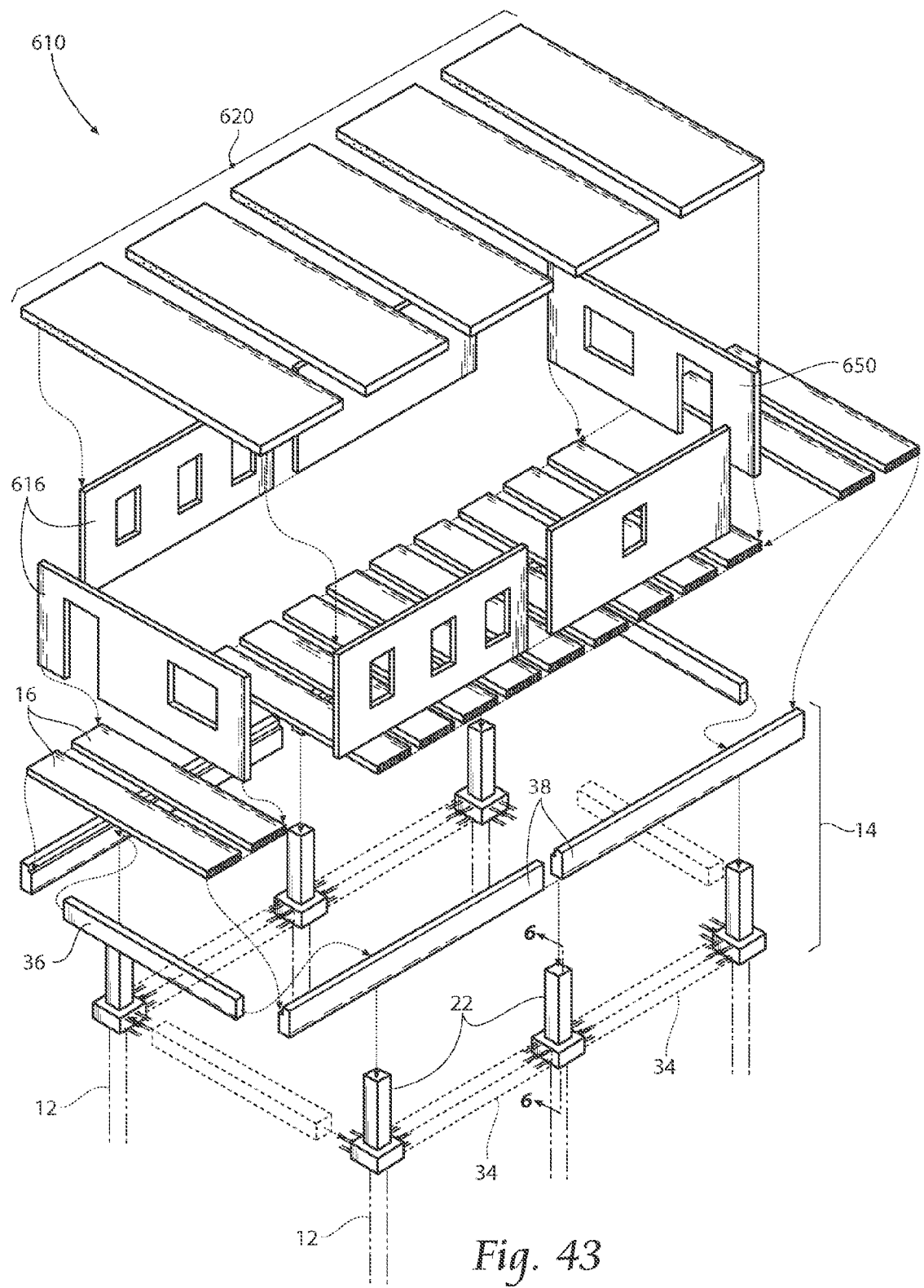
FIG. 43 is a perspective exploded view of an alternative embodiment of a modular building according to the present invention.

FIGS. 42 and 43 show an alternative embodiment of a modular concrete building 610 according to the present invention. The building 610 is similar to the previously described embodiments, but alternatively comprises a plurality of flat roof panels 620. The flat roof panels 620 are preferably constructed in one unitary piece and are substantially planar.

Preferably, each of the plurality of roof panels 620 is a concrete panel. The concrete panel may be precast or may be sitecast. The flat roof panel 620 preferably has a generally rectangular shape. The flat roof panel 620 may be a solid concrete panel or may be hollow. Each roof panel 620 includes a top surface 652, a bottom surface 654, a pair of end surfaces 653, and a pair of side surfaces 660. It is contemplated that it may be desirable that the exterior surfaces of the roof panels 620 have a waterproof membrane applied thereon.

Each of the plurality of roof panels 620 preferably has at least one aperture 630 formed through the panel, extending from the top surface 652 to the bottom surface 654, near each end surface of the panel 620. In particular, the aperture 630 may be pre-formed or drilled through the concrete panel 620 at a location where the side walls 616 meet the roof panel 620. The aperture is configured to receive a fixation member 394, such as a threaded rod, extending from the top surface 618 of the side wall 616 as described above. The fixation member may be rebar 655 extending from the side wall 616 or may be a female threaded rod anchor 656 that receives a male threaded rod 657 extending from the top surface 618 of the side wall 616

Figure 44:
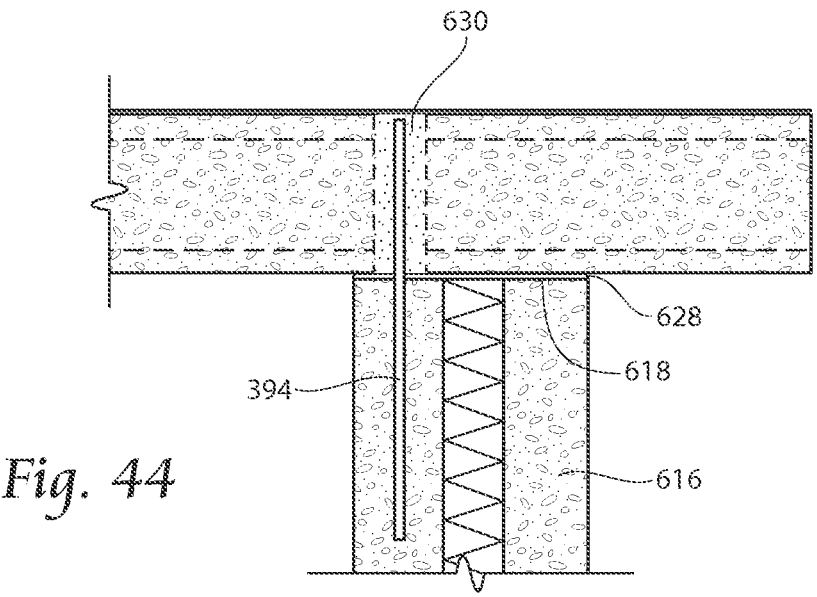
FIG. 44 is a close-up view of a joint between a wall panel and a roof panel in the building of FIG. 42.

When the other portions of the modular building are constructed as discussed above, the plurality of roof panels 620 may then be placed on top of the plurality of wall panels 616. A bearing pad 628 may be placed between the roof panel 620 and the wall panels 616. The roof panels 620 are then coupled to the plurality of wall panels 616 by securing the fixation member 394 in the aperture 630. The fixation member 394 may be secured in the aperture 630 in the roof panel 620 by filling the aperture 630 with a fixation material, such as non-shrinking grout, as shown in FIG. 44. Alternatively, as shown in FIG. 45, the fixation member 394 may be secured from the top of the roof panel 620 by placing a washer over the end of the fixation member 394 and tightening a locking member 396, such as a nut onto end of the fixation member 394.

Figure 45:
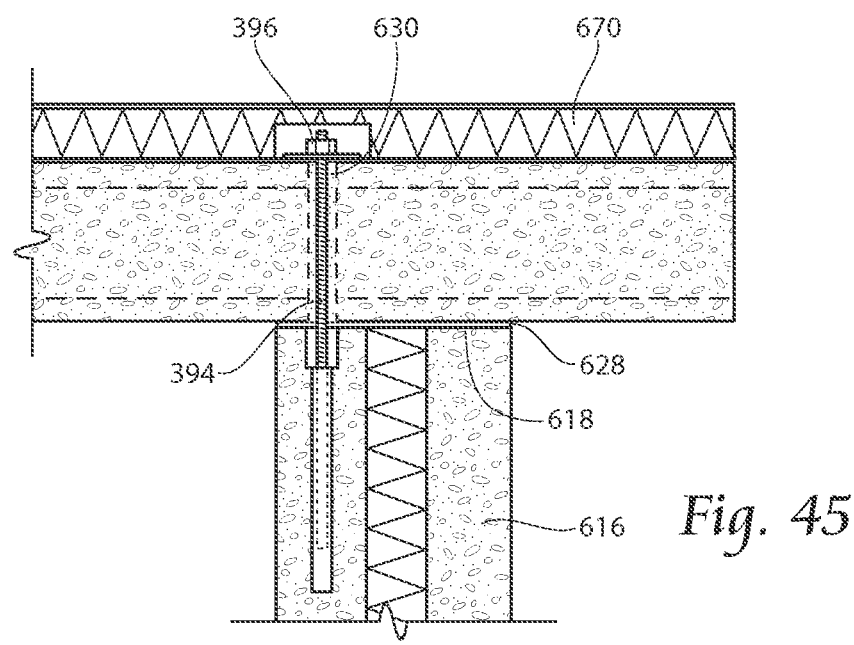
FIG. 45 is a close-up view of a second embodiment of a joint between a wall panel and a roof panel in the building of FIG. 42.
Figure 46:
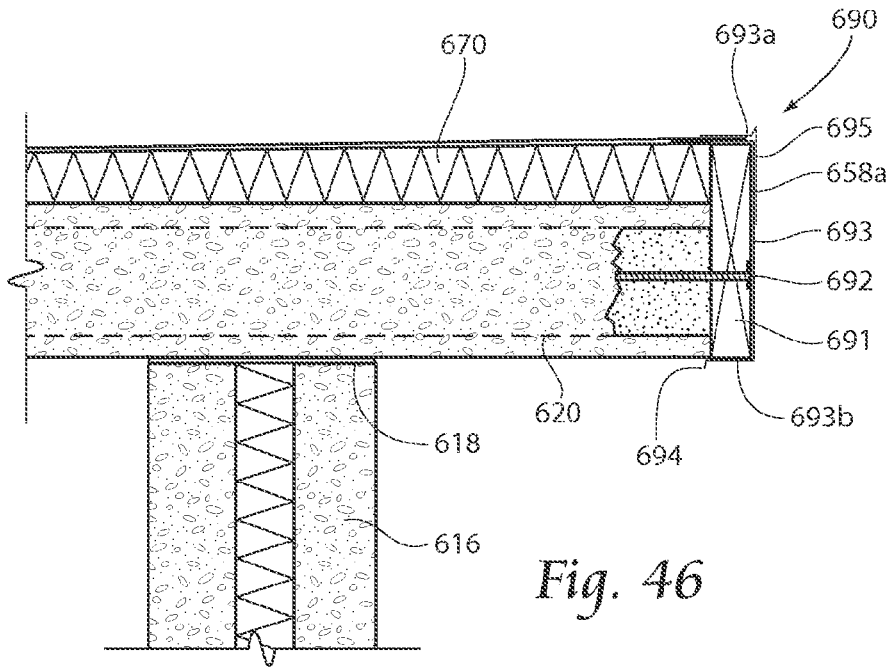
FIG. 46 is a close-up view of a joint between a wall panel and a roof panel of an alternative embodiment.

It is also contemplated that the roof panel 620 may be covered, on any of the external surfaces of the panel 620, by rigid insulation 670, as shown in FIGS. 45 and 46, to protect the waterproof membrane of the roof panel 620. In order to control drainage off of the flat roof panel 620, FIG. 46 shows that the rigid insulation 670 may be tapered from a first end to a second end, such that the insulation 670 is thickest at a first end surface 658a and thinnest at an opposing second end surface.

Figure 47:
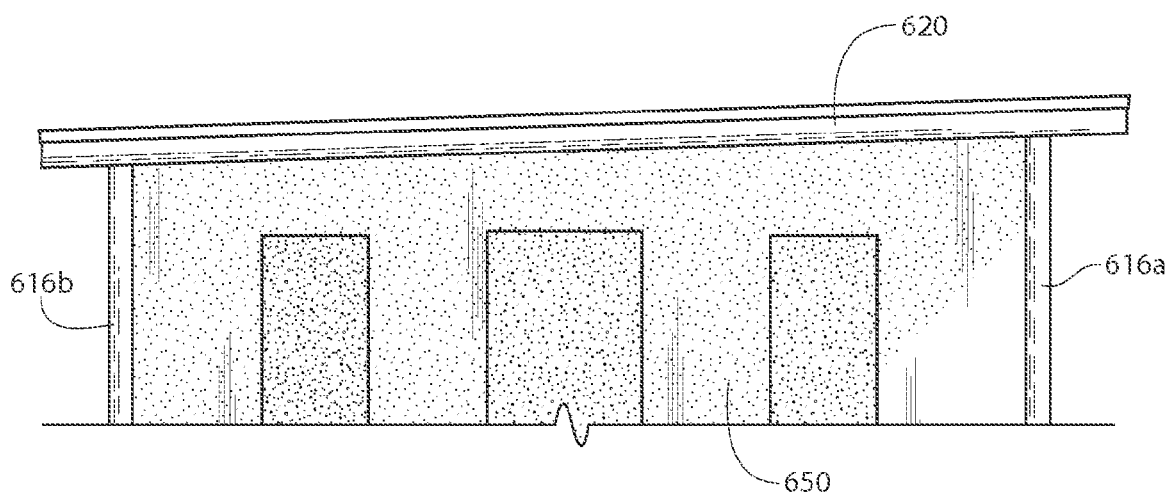
FIG. 47 is a partial front plan view of an alternative embodiment of a modular building according to the present invention.

In an alternative embodiment, shown in FIG. 47, drainage control may be accomplished by having the flat roof panel 620 constructed in a tilted position. One way of attainting the tilted position may be accomplished by providing a pair of opposing side wall panels 616a, 616b having different heights, such that one end of the roof panel 620 is situated at a higher elevation than the opposing end. In this embodiment, the plurality of end wall panels 650 must be constructed with a tilted top end surface to interface with the tilted roof panels 620. Any gaps formed at the joints, in this or any embodiment, between the side wall panels 616 and the roof panels 620 may be sealed by caulk as is known in the art. The same configuration can be accomplished wherein the roof panels are titled from a first end wall 650 to a second end wall 650, thereby tilting the roof from front to back, or vice versa, rather than from one side to the other.

The roof panel may also comprise a wood nailer 691 coupled thereto. The wood nailer 691 may be coupled by an attachment means such as a concrete anchor 692, as shown in FIG. 46.

It is also shown in FIG. 46 that the roof panel 620 may comprise an end cap assembly 690. Coupled around the end of the concrete panel 620 and insulation 670, as well as the wood nailer 691, there may be a flashing element 693. The flashing may be substantially bracket shaped such that a top 693a and bottom 693b section extend on top of the insulation 670 and below the roof panel 620, respectively. The top section 693a and bottom section 693b may be positioned directly adjacent to the top and bottom of the wood blocking 691 and/or the insulation 670. Where the bottom section 693b of the flushing 693 ends, there may preferably be a drip 694 to direct any water or liquid away from the underside of the roof panel 620. The end cap assembly 690 may further comprise a cap 695 for the flashing, which covers at least the top corner of the flashing bracket 693.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

We claim:

1. A method comprising:
   providing a foundation;
   providing a plurality of support columns, each of said support columns having a top surface and a bottom surface, each of said support columns having a cavity formed in the bottom surface thereof;
   providing a plurality of support beams, each of said support beams having a top surface, a bottom surface, an inside surface, an outside surface, a pair of opposed end surfaces, and a ledge extending from the inside surface, the ledge having an inside surface, an top surface, and a bottom surface;
   providing a plurality of wall panels, each of the wall panels having an inner surface, an outer surface, a top surface, a bottom surface, a first side surface, and a second side surface;
   providing the plurality of wall panels each having at least one securing member extending from the bottom surface and at least one fixation member extending from the top surface;
   providing the plurality of support beams each having at least one bore formed in the top surface for receiving the at least one securing member of a corresponding wall panel;
   providing a plurality of floor panels, each of said floor panels having a top surface, a bottom surface, a first side surface, a second side surface, a first end surface and a second end surface;
   providing a plurality of roof panels, each of said roof panels having a top surface, a bottom surface, a first side, a second side, a first end, and a second end;
   providing the plurality of roof panels with an aperture formed in the bottom surface for receiving the at least one fixation member of a corresponding wall panel;

placing the plurality of support columns on the foundation;

placing the plurality of support beams on the support columns such that the bottom surface of each support beams engages a top surface of a corresponding support column;

placing the plurality of floor panels on the support beams such that the bottom surface of each floor panels engages a top surface of the ledge on a corresponding support beam;

placing the plurality of wall panels on the support beams such that the securing member extending from the bottom surface of each wall panel engages the bore formed in the top surface of a corresponding support beam; and placing the plurality of roof panels on the wall panels such that the fixation means on the top surface of each roof panel engages the aperture formed in the bottom surface of a corresponding roof panel.

2. The method of claim 1 wherein each of said roof panels is substantially flat.

3. The method of claim 1 wherein said plurality of roof panels further comprise at least one aperture extending from the top surface to the bottom surface for receiving the at least one fixation member.

4. The method of claim 3 wherein the placing the plurality of roof members step further comprises securing each roof member to an associated wall panel in at least one location.

5. The method of claim 4 wherein the securing each roof member to an associated wall panel further comprises filling the aperture with non-shrinking grout to thereby secure the fixation member in the aperture.

6. The method of claim 4 wherein the securing each roof member to an associated wall panel further comprises securing said fixation member within said aperture by securing a locking member on a distal end of the fixation member.

7. The method of claim 1 wherein the plurality of roof panels further comprises at least one layer of insulation, said at least one layer of insulation having a first end surface and a second end surface, corresponding with the first end surface and the second end surface of the roof panels.

8. The method of claim 7 wherein said layer of insulation is tapered in thickness from a first end surface to a second end surface.

9. The method of claim 2 wherein the placing the plurality of roof members step further comprises placing the plurality of roof members in a tilted position, wherein a first of either the end surface or side surface of at least one roof panel is higher in elevation than a second, opposing end surface or side surface of the at least one roof panel.

10. The method of claim 7 further comprising providing a wood nailer coupled to either the first or the second end surface of both the insulation and the roof panel.

11. The method of claim 10 wherein the wood nailer is coupled to the roof panel by a concrete anchor.

12. The method of claim 10 wherein the roof panel further comprises an end cap apparatus that is coupled to and around the wood nailer.

13. The method of claim 12 wherein the end cap apparatus further comprises a flashing bracket configured to be positioned around the wood nailer, said flashing bracket terminating at a bottom section in a drip element, and a flashing cap.

* * * * *